United States Patent
Uno

(10) Patent No.: US 8,333,660 B2
(45) Date of Patent: Dec. 18, 2012

(54) GAME PROGRAM, GAME APPARATUS, AND GAME CONTROL METHOD

(75) Inventor: Satoshi Uno, Osaka (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 967 days.

(21) Appl. No.: 12/190,775

(22) Filed: Aug. 13, 2008

(65) Prior Publication Data

US 2009/0069095 A1 Mar. 12, 2009

(30) Foreign Application Priority Data

Sep. 11, 2007 (JP) ................................. 2007-235453

(51) Int. Cl.
*A63F 9/24* (2006.01)

(52) U.S. Cl. .......... 463/31; 463/3; 463/4; 463/7; 463/23; 463/37; 463/38; 463/43; 273/108.31; 273/108.32; 273/317.6; 273/460; 273/461

(58) Field of Classification Search ................ 463/3, 23, 463/43, 4, 7, 37, 31, 38; 273/108.31, 108.32, 273/317.6

See application file for complete search history.

(56) References Cited

U.S. PATENT DOCUMENTS

| 6,270,413 B1 * | 8/2001 | Aikawa et al. | 463/31 |
| 2007/0155457 A1 * | 7/2007 | Fujioka et al. | 463/3 |

* cited by examiner

*Primary Examiner* — Sundit Pandya

(74) *Attorney, Agent, or Firm* — Global IP Counselors, LLP

(57) ABSTRACT

In this program, a regulation command for controlling the movement of a first character is recognized by a control unit. After the regulation command for the first character is recognized by the control unit, a movement command for operating a second character is recognized by the control unit. Then, the state that the second character is moving based on the movement command is displayed on an image displaying unit using image data. The first character with movement controlled based on the regulation command is displayed on the image displaying unit using image data. And, if the receiving of commands related to movements for the first character and the second character is terminated by the control unit, a process for changing the ability data of the first character is executed by the control unit.

9 Claims, 11 Drawing Sheets

GAME PROGRAM, GAME APPARATUS, AND GAME CONTROL METHOD

CROSS-REFERENCE TO THE RELATED APPLICATIONS

This application claims priority to Japanese Patent Application No. 2007-235453. The entire disclosure of Japanese Patent Application No. 2007-235453 is hereby incorporated herein by reference.

BACKGROUND OF THE INVENTION

1. Field of the Invention

The present invention relates to a game program, and in particular, a game program for realizing a game in which a first character and a second character are displayed on an image displaying unit, and a movement is executed by the first character for changing the moving direction of a moving object sent from the second character to a different direction. In addition, the present invention relates to a game apparatus capable of executing this game program, and a game control method controlled by a computer based on this game program.

2. Description of the Related Art

Various video games have been proposed in the past. These video games are executed in game apparatuses. For example, a typical game apparatus includes a monitor, a game machine main body that is separate from the monitor, and an input device separate from the game machine main body, such as a controller. A plurality of input buttons is arranged on the controller.

A baseball game, for instance, is one known video game that is executed in this kind of a game apparatus (refer to non-patent document 1: Professional Baseball Spirits 4, Konami Digital Entertainment Co., Ltd., PS3 version, Apr. 1, 2007). In this kind of a baseball game, a batter character can hit back a ball thrown by a pitcher character.

Here, for example, it is supposed that the player operates the controller to instruct a command related to batting to the batter character.

When the batter character and the pitcher character are displayed on the monitor, a meet zone that shows the region in which the ball can be hit by the batter character is also displayed on the monitor. In this state, if the pitcher character starts a pitching movement and releases the ball, an anticipated passing position of the ball is displayed on the monitor. In this case, if the player operates the controller, the meet zone moves. Then, when the anticipated passing position of the ball is positioned in the meet zone, if the player operates the controller to instruct a swing starting command to the batter character, after the batter character who performs the swing movement is displayed on the monitor, the ball hit back by the batter character is displayed on the monitor. On the other hand, when the anticipated passing position of the ball is not positioned inside the meet zone, if the player operates the controller to instruct a swing starting command to the batter character, a batter character performing the movement of a missed swing is displayed on the monitor. In this manner, the player can operate the controller to instruct a command related to batting to the batter character.

SUMMARY OF INVENTION

In a conventional baseball game, a player moves the meet zone and instructs the swing starting command to enable the batter character to execute a swing movement. In this manner, in a conventional baseball game, the state that the batter performs a swing movement in a real world baseball game can be reproduced through the player operating the controller.

On the other hand, with the upgrading of baseball games in recent years, not only the movement of the batter in a real world baseball game as described above is reproduced in a baseball game, there has been attempts of also reflecting the effect that the intention of a batter in a real world baseball game has on a play in a baseball game. However, since the intention of a batter in a real world baseball game, different from the movements of the batter, is not substantial, reproducing the effect that the intention of the batter has on a play in a baseball game is one of the great challenges that the game providers face.

In order to resolve this kind of a challenge, this invention allows the game player to be able to experience the effect that the intention of a real player will have on a play in a game.

The game program according to a first aspect is a program for implementing the following functions on a computer that is capable of executing a game in which a first character and a second character are displayed on an image displaying unit, and a movement for changing the moving direction of a moving object sent out from the second character to a different direction is executed by the first character.

(1) A first ability data recognition function whereby the ability data that shows the ability of the first character is recognized by a control unit.

(2) A regulation command recognition function whereby a regulation command for controlling the movement of the first character is recognized by the control unit.

(3) A movement command recognition function whereby a movement command for operating the second character is recognized by the control unit, after the regulation command for the first character is recognized by the control unit.

(4) A movement display function for displaying the state that the second character is moving on the image displaying unit using image data, based on the movement command.

(5) A controlled movement display function for displaying the first character with the movement controlled on the image displaying unit using image data, based on the regulation command.

(6) A command receipt termination function whereby the receiving of commands related to movements for the first character and the second character is terminated by the control unit.

(7) A first ability alteration function whereby the process of changing the ability data of the first character is executed by the control unit, if the receiving of commands related to movements for the first character and the second character is terminated by the control unit.

With this game program, in the first ability data recognition function, the ability data that shows the ability of the first character is recognized by the control unit. In the regulation command recognition function, the regulation command for controlling the movement of the first character is recognized by the control unit. In the movement command recognition function, after the regulation command for the first character is recognized by the control unit, the movement command for operating the second character is recognized by the control unit. In the movement display function, based on the movement command, the state that the second character is moving is displayed on the image displaying unit using image data. In the controlled movement display function, based on the regulation command, the first character with movement controlled is displayed on the image displaying unit using image data. In the command receipt termination function, the receiving of commands related to movements for the first character and the second character is terminated by the control unit. In the first ability alteration function, if the receiving of commands related to movements for the first character and the second character is terminated by the control unit, the process of changing the ability data of the first character is executed by the control unit.

For example, if a baseball game is executed by using this game program, the ability data that shows the ability of the batter character is recognized by the control unit. Then, a swing regulation command, for example, a send-off command, for controlling the swing movement of the batter character is recognized by the control unit. After the send-off command for the batter character is recognized by the control unit, a command related to pitching (pitching related command) of the pitcher character is recognized by the control unit. Based on the pitching related command, the state in which the pitcher character pitches is displayed on the image displaying unit using image data. At this time, based on the send-off command, the batter character in the send-off movement is displayed on the image displaying unit using image data. And, the receiving of commands related to movements for the batter character and the pitcher character is terminated by the control unit. If the receiving of commands related to movements for the batter character and the pitcher character is terminated by the control unit, the process of changing the ability data of the batter character is executed by the control unit.

In this case, after the send-off command for the batter character is recognized by the control unit, based on the pitching related command for operating the pitcher character, the state that the pitcher character pitches is displayed on the image displaying unit. In addition, based on the send-off command, the batter character in the send-off movement is displayed on the image displaying unit. Then, if the receiving of commands related to movements for the batter character and the pitcher character ends, the process of changing the ability data of the batter character is executed by the control unit.

In this manner, with the invention according to the first aspect, the send-off command can be instructed to the batter character to have the mental attitude of a batter of observing the ball carefully. In addition, when the receiving of commands related to movements for the batter character and the pitcher character ended, for example, when one play has ended, the ability data of the batter character can be altered.

As a result, the following kind of strategies and tactics, not found in conventional games, can be realized, and an extremely interesting game can be provided.

For instance, an example is shown below of the psychological game that can occur between the batter character and the pitcher character. The player knows that the ability data of the batter character changes (for example, rises), by instructing a send-off command of the ball to the batter character. Thus, the player is conscious about instructing the send-off command at an early count of preferably the first throw or the second throw, in order for the developments after being at the plate to progress favorably. In addition, even if the ability data of the batter character rises, count continues, for example, in the state after two strikes, because it is possible that it will become a strike out next, when in this state, the player will try to avoid instructing a send-off command. Thus, when in this state, the player is conscious about instructing the send-off command early to the batter character.

On the other hand, since the opponent player thinks that the player who instructs commands to the batter character will instruct the send-off command early, the opponent player keeps in mind to instruct the pitcher character to throw a strike at an early count, taking advantage of this send-off command. With respect to this, since it is natural for the player who instructs commands to the batter character to also predict the way the pitcher character thinks, contrary to the above strategy, the player is conscious about the strategy of performing batting at an early count.

In this manner, with this invention, it is possible to reflect the psychological game that can occur between the batter character and the pitcher character in the baseball game.

In addition, for instance, another example is shown below of the psychological game that can occur between the batter character and the pitcher character. In the case that the situation is favorable to the batter character, like an oh for two, the player who instructs commands to the batter character knows that he or she has to instruct the batter character with a send-off command. The reason for this is, in this situation, if the player instructs a send-off command, even if a strike is scored, the ability of the batter character rises, and even if it becomes three balls, the situation is even more favorable.

When considering from the standpoint of the opponent player in this situation, since the situation is extremely unfavorable to the pitcher character if it becomes three balls, the opponent player will try to aim for a strike for the next ball, so that it will not become three balls. With respect to this, since it is natural for the player who instructs commands to the batter character to also predict the way the pitcher character thinks, contrary to the above strategy, the player is conscious about the strategy of performing batting aiming for the ball. On the other hand, the opponent player tries to avoid three balls, and considers that the player who operates the batter character will try to outwit his or her plan and will perform batting, and daringly, sometimes consider throwing the ball.

Other than the above examples, depending on the count situation or the existence of the runner, or the like, various kinds of psychological battles can occur. However, by providing the send-off function and function of ability alteration along with the send-off like the present invention, high level of psychological games not found in conventional games can be experienced in a baseball game, and the game can also be more interesting.

By doing so, by reflecting the effect that the mental attitude of the batter in a real baseball game has on a play in the baseball game, the player can experience the effect that the mental attitude of the batter has on a play in the baseball game. That is, the effect that the intention of a real player has on a play can be experienced by a game player in the game. In addition, in a real baseball game, although the ability of the batter does not become higher along with the send-off, in the present invention, while using the changes of the psychological state of a real baseball player, the present invention is configured as described above to make the baseball game more interesting.

The game program according to a second aspect is the game program according to the first aspect, and is a program for further implementing the following functions on a computer.

(8) A target image display function for displaying a target image that shows the target for the movement that the first character performs, on the image displaying unit, using image data for the target.

(9) A movement command recognition judgment function whereby whether or not a movement command for operating the first character is recognized by the control unit is judged by the control unit, when the first character with the movement controlled is displayed on the image displaying unit using image data, based on the regulation command.

(10) A target image alteration function whereby a process for changing the image data for the target so that the target image becomes smaller is executed by the control unit, if a movement command for operating the first character is recognized by the control unit.

With this game program, in the target image display function, the target image that shows the target for the movement that the first character performs is displayed on the image displaying unit using the image data for the target. In the movement command recognition judgment function, based on the regulation command, when the first character with the movement controlled is displayed on the image displaying unit using image data, whether or not a movement command for operating the first character is recognized by the control unit is judged by the control unit. In the target image alteration function, if a movement command for operating the first character is recognized by the control unit, a process for changing the image data for the target so that the target image becomes smaller is executed by the control unit.

For example, if a baseball game is executed by using this game program, the target, for example, the meet zone, for the swing movement that the batter character performs is displayed on the image displaying unit using image data for the meet zone. When the batter character in the send-off movement is displayed on the image displaying unit, whether or not the swing starting command for making the batter character perform the swing movement is recognized by the control unit is judged by the control unit. And, if the swing starting command is recognized by the control unit, the process for changing the image data for the meet zone so that the meet zone becomes smaller is executed by the control unit.

In this case, after the send-off command for the batter character is recognized by the control unit, if the swing starting command is recognized by the control unit, the process for changing the image data for the meet zone so that the meet zone becomes smaller is executed by the control unit.

In this manner, with the invention according to the second aspect, after the send-off command is instructed to the batter character to have the mental attitude of a batter of observing the ball carefully, if a movement contrary to the send-off movement, that is, a swing movement, is executed by the batter character, the effect that the movement contrary to the send-off movement has on a play can be experienced by the player through the meet zone being made smaller. In this way, the effect that the intention of a batter has on a play in a real baseball game can be experienced by the game player in the baseball game. That is, the effect that the intention of a player has on a play in reality can be experienced by the game player in the game.

The game program according to a third aspect is the game program according to the first or second aspect, and is a program for further implementing the following function on a computer.

(11) A movement command recognition judgment function whereby whether or not a movement command for operating the first character is recognized by the control unit is judged by the control unit, when the first character with the movement controlled is displayed on the image displaying unit using image data, based on the regulation command.

With this game program, in the movement command recognition judgment function, when the first character with movement controlled based on the regulation command is displayed on the image displaying unit using image data, whether or not a movement command for operating the first character is recognized by the control unit is judged by the control unit. In this case, in the first ability alteration function, if the movement command for operating the first character is not recognized by the control unit, and the receiving of commands related to movements for the first character and the second character is terminated by the control unit, the process for changing the ability data so that the ability of the first character becomes higher is executed by the control unit.

For example, if a baseball game is executed using this game program, when the batter character during send-off based on the send-off command is displayed on the image displaying unit using image data, whether or not the swing starting command for making the batter character perform a swing movement is recognized by the control unit is judged by the control unit. Then, if the swing starting command for making the batter character perform a swing movement is not recognized by the control unit, and the receiving of commands related to movements for the batter character and the pitcher character is terminated by the control unit, the process for changing the ability data so that the ability of the batter character becomes higher is executed by the control unit.

In this case, after the send-off command for the batter character is recognized by the control unit, if the swing starting command is not recognized by the control unit, and the receiving of commands related to movements for the batter character and the pitcher character is terminated by the control unit, the process of changing the ability data so that the ability of the batter character becomes higher is executed by the control unit.

In this manner, with the invention according to the third aspect, after the send-off command is instructed to the batter character to have the mental attitude of a batter of observing the ball carefully, if one play ended during the send-off movement, the effect that the send-off movement (movement corresponding to the mental attitude of the batter of observing the ball carefully) has on a play can be experienced by the player through the ability data being changed so that the ability of the batter character becomes higher. By doing so, the effect that the intention of a batter has on a play in a real baseball game can be experienced by the game player in the baseball game. That is, the effect that the intention of a player has on a play in reality can be experienced by the game player in the game.

The game program according to a fourth aspect is the game program according to any of the first to the third aspects, and is a program for further implementing the following function on a computer.

(12) A first annunciation image display function for displaying a first annunciation image for informing the ability of the first character on the image displaying unit based on ability data of the first character.

With this game program, in the first annunciation image display function, the first annunciation image for informing the ability of the first character is displayed on the image displaying unit based on the ability data of the first character.

For example, if a baseball game is executed using this game program, the first annunciation image for informing the ability of the batter character is displayed on the image displaying unit based on the ability data of the batter character. More specifically, based on the ability data that shows the corresponding ability of the batter character for each course, the courses that the batter character is good at and poor at are displayed on the image displaying unit using the image data for the first annunciation image.

In this case, the effect that the mental attitude of the batter of observing the ball carefully has on a play can be confirmed by the player, through the first annunciation image corresponding to the altered ability data of the batter character, for example, the first annunciation image corresponding to the ability data that shows the corresponding ability of the batter character for each course.

The game program according to a fifth aspect is the game program according to any of the first to the fourth aspects, and is a program for further implementing the following functions on a computer.

(13) A second ability data recognition function whereby ability data that shows the ability of the second character is recognized by the control unit.

(14) A second ability alteration function whereby a process for changing the ability data of the second character is executed by the control unit, if the receiving of commands related to movements for the first character and the second character is terminated by the control unit.

With this game program, in the second ability data recognition function, the ability data that shows the ability of the second character is recognized by the control unit. In the second ability alteration function, if the receiving of commands related to movements for the first character and the second character is terminated by the control unit, the process for changing the ability data of the second character is executed by the control unit.

For example, if a baseball game is executed using this game program, the ability data that shows the ability of the pitcher character is recognized by the control unit. And, if the receiving of commands related to movements for the batter character and the pitcher character is terminated by the control unit, the process of changing the ability data of the pitcher character is executed by the control unit.

In this case, if the send-off command for the batter character is recognized by the control unit, and the receiving of commands related to movements for the batter character and the pitcher character is terminated by the control unit, the process of changing the ability data of the pitcher character is executed by the control unit.

In this manner, with the invention according to the fifth aspect, the send-off command can be instructed to the batter character to have the mental attitude of the batter of observing the ball carefully. In addition, when the receiving of commands related to movements for the batter character and the pitcher character is terminated, for example, when one play ended, the ability data of the pitcher character can be changed. As a result, the effect that the mental attitude of the batter has on the pitcher directly in a real baseball game, the effect on the batter indirectly through the pitcher, and the like can be reflected in the baseball game. Thus, the effect that the mental attitude of the batter has on a play can be experienced by the player in the baseball game. That is, the effect that the intention of the player has on a play in reality can be experienced by the game player in the game.

The game program according to a sixth aspect is the game program according to the fifth aspect, and is a program for further implementing the following function on a computer.

(15) A movement command recognition judgment function whereby whether or not a movement command for operating the first character is recognized by the control unit is judged by the control unit, when the first character with the movement controlled is displayed on the image displaying unit using image data, based on the regulation command.

With this game program, in the movement command recognition judgment function, when the first character with the movement controlled based on the regulation command is displayed on the image displaying unit using image data, whether or not a movement command for operating the first character is recognized by the control unit is judged by the control unit. In this case, in the second ability alteration function, if a movement command for operating the first character is not recognized by the control unit, and the receiving of commands related to movements for the first character and the second character is terminated by the control unit, a process for changing the ability data so that the ability of the second character becomes lower is executed by the control unit.

For example, if a baseball game is executed using this game program, when the batter character in send-off based on the send-off command is displayed on the image displaying unit using image data, whether or not the swing starting command for making the batter character perform a swing movement is recognized by the control unit is judged by the control unit. And, if the swing starting command for making the batter character perform a swing movement is not recognized by the control unit, and the receiving of commands related to movements for the batter character and the pitcher character is terminated by the control unit, the process for changing the ability data so that the ability of the pitcher character becomes lower is executed by the control unit.

In this case, after the send-off command for the batter character is recognized by the control unit, if the swing starting command is not recognized by the control unit, and the receiving of commands related to movements for the batter character and the pitcher character is terminated by the control unit, the process for changing the ability data so that the ability of the pitcher character becomes lower is executed by the control unit.

In this manner, with the invention according to the sixth aspect, after the send-off command is instructed to the batter character to have the mental attitude of a batter of observing the ball carefully, if one play ended during the send-off movement, the effect that the send-off movement (movement corresponding to the mental attitude of the batter of observing the ball carefully) has on a play can be experienced by the player through the ability data being changed so that the ability of the pitcher character becomes lower. More specifically, the ability data changed so that the ability of the pitcher character becomes lower can be thought of as the ability of the batter character becoming relatively higher. Thus, in this case, by indirectly making the ability of the batter character higher with respect to the pitcher character, the effect that the send-off movement has on a play can be experienced by the player in the baseball game. That is, the effect that the intention of a player has on a play in reality can be experienced by the game player in the game.

The game program according to a seventh aspect is the game program according to the fifth or the sixth aspect, and is a program for further implementing the following function on a computer.

(16) A second annunciation image display function for displaying a second annunciation image for informing the ability of the second character on the image displaying unit based on ability data of the second character.

With this game program, in the second annunciation image display function, the second annunciation image for informing the ability of the second character is displayed on the image displaying unit based on the ability data of the second character.

For example, if a baseball game is executed using this game program, the second annunciation image for informing the ability of the pitcher character is displayed on the image displaying unit based on the ability data of the pitcher character. More specifically, based on the ability data that shows the strength of the ball that the pitcher character throws, the size of the ball thrown from the pitcher character is displayed on the image displaying unit using image data for the second annunciation image.

In this case, the player can confirm the effect that the mental attitude of the batter of observing the ball carefully has on a play, through the second annunciation image corresponding to the altered ability data of the pitcher character, for example, the second annunciation image corresponding to the ability data that shows the strength of the ball.

The game apparatus according to an eighth aspect is a game apparatus that is capable of executing a game in which a first character and a second character are displayed on an image displaying unit, and a movement for changing the moving direction of a moving object sent out from the second character to a different direction is executed by the first character. This game apparatus includes a first ability data recognition means whereby ability data that shows the ability of the first character is recognized by a control unit, a regulation command recognition means whereby a regulation command for controlling the movement of the first character is recognized by the control unit, a movement command recognition means whereby a movement command for operating the second character is recognized by the control unit, after the regulation command for the first character is recognized by the control unit, a movement display means for displaying the state that the second character is moving on the image displaying unit using image data, based on the movement command, a controlled movement display means for displaying the first character with the movement controlled on the image displaying unit using image data, based on the regulation command, a command receipt termination means whereby the receiving of commands related to movements for the first character and the second character is terminated by the control unit, and a first ability alteration means whereby a process for changing the ability data of the first character is executed by the control unit, if the receiving of commands related to movements for the first character and the second character is terminated by the control unit.

The game control method according to a ninth aspect is a game control method that is capable of controlling a game in which a first character and a second character are displayed on an image displaying unit, and a movement for changing the moving direction of a moving object sent out from the second character to a different direction is executed by the first character. This game control method includes a first ability data recognition step whereby ability data that shows the ability of the first character is recognized by a control unit, a regulation command recognition step whereby a regulation command for controlling the movement of the first character is recognized by the control unit, a movement command recognition step whereby a movement command for operating the second character is recognized by the control unit, after the regulation command for the first character is recognized by the control unit, a movement display step for displaying the state that the second character is moving on the image displaying unit using image data, based on the movement command, a controlled movement display step for displaying the first character with the movement controlled on the image displaying unit using image data, based on the regulation command, a command receipt termination step whereby the receiving of commands related to movements for the first character and the second character is terminated by the control unit, and a first ability alteration step whereby a process for changing the ability data of the first character is executed by the control unit, if the receiving of commands related to movements for the first character and the second character is terminated by the control unit.

With this invention, after the regulation command for controlling the movement of the first character is recognized by the control unit, based on the movement command for operating the second character, the state that the second character is moving is displayed on the image displaying unit. In addition, based on the regulation command for controlling the movement of the first character, the first character with movement controlled is displayed on the image displaying unit. And, if the receiving of commands related to movements for the first character and the second character terminates, the process of changing the ability data of the first character is executed by the control unit.

In this manner, in the present invention, after the regulation command for controlling the movement of the first character is recognized, if the receiving of commands related to movements for the first character and the second character terminates, the ability data of the first character is altered. More specifically, in the present invention, the effect that the mental attitude of a player has on a play in reality is reflected in the game by the configuration of changing the ability data of the player character. By doing so, the game player can experience the effect that the mental attitude of a player has on a play in the game. That is, the game player can experience the effect that the intention of a player has on a play in reality in the game.

BRIEF DESCRIPTION OF THE DRAWINGS

Referring now to the attached drawings which form a part of this original disclosure.

BRIEF DESCRIPTION OF THE PREFERRED EMBODIMENTS

Configuration and Operation of the Game Apparatus

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
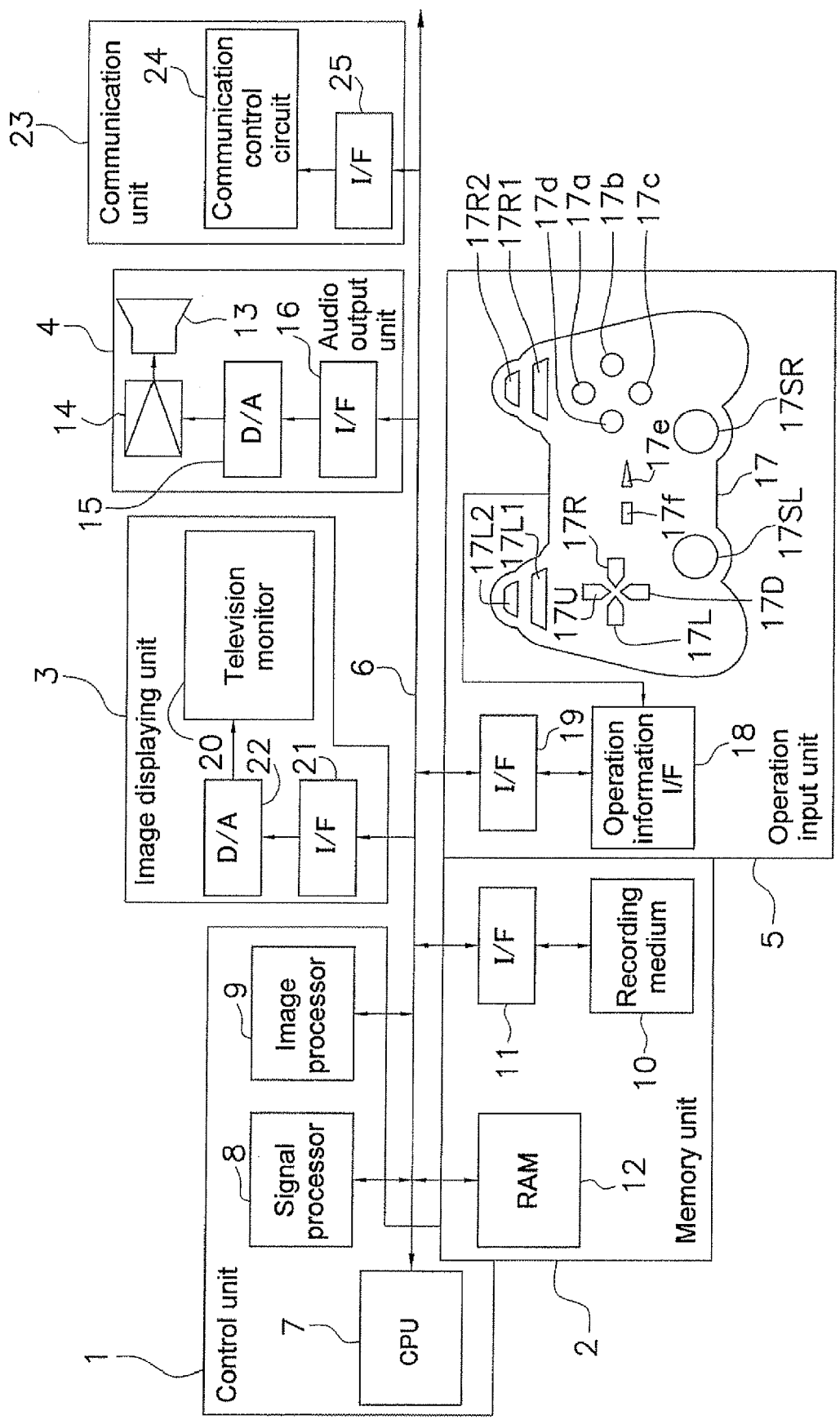
FIG. 1 is a basic configuration diagram of a video game apparatus according to an embodiment of the present invention.

FIG. 1 shows the basic configuration of a game apparatus according to an embodiment of the present invention. Here, a home video game apparatus will be described as an example of a video game apparatus. The home video game apparatus is provided with a home game machine main body and a home television. A recording medium 10 can be mounted in the home game machine main body, and game data is read as needed from the recording medium 10 and the game is executed. In this manner, the executed game content is displayed on the home television.

A game system of a home video game apparatus is composed of a control unit 1, a memory unit 2, an image display unit 3, an audio output unit 4, an operation input unit 5, and a communication unit 23, and each of these are connected via a bus 6. The bus 6 includes an address bus, a data bus, a control bus, and the like. Here, the control unit 1, the memory unit 2, the audio output unit 4, and the operation input unit 5 are contained in the home game machine main body of the home video game apparatus, and the image display unit 3 is contained in the home television.

The control unit 1 is mainly provided for controlling, based on a game program, the progress of the entire game. The control unit 1 is composed of, for instance, a CPU (Central Processing Unit) 7, a signal processor 8, and an image processor 9. The CPU 7, the signal processor 8, and the image processor 9 are mutually connected through the bus 6. The CPU 7 interprets commands from the game program, performs various data processing and various kinds of controls. For example, the CPU 7 commands the signal processor 8 to feed image data to the image processor. The signal processor 8 primarily performs calculations in a 3D space, calculations for converting positions from the 3D space to a virtual 3D space, light source calculation process, and image and audio data generation and processing process based on the calculation result executed in the 3D space or the virtual 3D space. Based on the calculation results and processing results of the signal processor 8, the image processor 9 primarily performs a process in which image data to be visualized is written to a RAM 12. In addition, the CPU 7 commands the signal processor 8 to process various data. The signal processor 8 primarily performs calculations corresponding to various data in 3D space, and calculations for converting positions from 3D space to a virtual 3D space.

The memory unit 2 is provided primarily for storing program data and various data used by the program data, and other data. The memory unit 2 is, for instance, composed of a recording medium 10, an interface circuit 11, and a RAM (Random Access Memory) 12. The interface circuit 11 is connected to the recording medium 10. The interface circuit 11 and the RAM 12 are connected through the bus 6. The recording medium 10 is a medium for recording the program data of the operation system, game data composed of image data, audio data, and various program data, and other data. The recording medium 10 is, for instance, a ROM (Read Only Memory) cassette, optical disk, flexible disk, or the like, and the program data of the operating system, the game data, and other data are recorded on the recording medium 10. In addition, the recording medium 10 also includes a card memory, and the card memory is primarily used for saving various game parameters at breakpoints when the game has been suspended. The RAM 12 temporarily stores various data that are read from the recording medium 10 and are used for temporarily recording processing results from the control unit 1. Stored in the RAM 12 are various data as well as address data that shows the recording position of various data, and any address can be specified and address data can be read from or written to the specified address.

The image display unit 3 is provided primarily for outputting the image data written into the RAM 12 by the image processor 9, the image data that is read from the recording medium 10, and the like, as images. The image display unit 3 is composed of, for instance, a television monitor 20, an interface circuit 21, and a D/A converter (Digital-to-Analog converter) 22. The D/A converter 22 is connected to the television monitor 20, and the interface circuit 21 is connected to the D/A converter 22. The bus 6 is connected to the interface circuit 21. In this case, image data is fed to the D/A converter 22 through the interface circuit 21, and converted at this point into an analog image signal. The analog image signal is then outputted as an image to the television monitor 20.

Examples of image data include polygon data and texture data. The polygon data is coordinate data of the apices constituting a polygon. The texture data is designed to set the texture of the polygon, and is composed of texture instruction data and texture color data. The texture instruction data is data for correlating the polygon and texture, and the texture color data is data for specifying the color of the texture. In this case, polygon address data and texture address data showing the memory position of each of the data are correlated with the polygon data and texture data. With such image data, the polygon data (3D polygon data) in a 3D space defined by the polygon address data is subjected by the signal processor 8 to coordinate transformation and perspective projection transformation on the basis of rotation variable data and movement variable data of the screen as such (point of view), and the result is substituted into polygon data in a 2D space (2D polygon data). The plurality of 2D polygon data composes a polygon outline, and the texture data indicated by the texture address data is written into the internal areas of the polygon. Objects, i.e., various characters, can thus be expressed on which texture is overlaid on each of the polygons.

The audio output unit 4 is provided primarily for outputting audio data read out from the recording medium 10 as audio output. The audio output unit 4 is composed of, e.g., a speaker 13, an amplifier circuit 14, a D/A converter 15, and an interface circuit 16. The amplifier circuit 14 is connected to the speaker 13, the D/A converter 15 is connected to the amplifier circuit 14, and the interface circuit 16 is connected to the D/A converter 15. The bus 6 is connected to the interface circuit 16. In this configuration, audio data is fed to the D/A converter 15 through the interface circuit 16 and is converted at this point to an analog audio signal. The analog audio signal is amplified by the amplifier circuit 14 and is outputted as audio from the speaker 13. Examples of audio data include ADPCM (Adaptive Differential Pulse Code Modulation) data and PCM (Pulse Code Modulation) data. In the case of ADPCM data, audio can be outputted from the speaker 13 by using the same processing method as that described above. In the case of PCM data, PCM data is converted to ADPCM data in the RAM 12, whereby audio can be outputted from the speaker 13 by using the same processing method as that described above.

The operation input unit 5 is primarily composed of a controller 17, an operation information interface circuit 18, and an interface circuit 19. The operation information interface circuit 18 is connected to the controller 17, and the interface circuit 19 is connected to the operation information interface circuit 18. The bus 6 is connected to the interface circuit 19.

The controller 17 is an operating device that the player uses to input various operation commands, and transmits to the CPU 7 operation signals that correspond with the operation performed by the player. The controller 17 is provided with a first button 17a, a second button 17b, a third button 17c, a fourth button 17d, an up-direction key 17U, a down-direction key 17D, a left-direction key 17L, a right-direction key 17R, an L1 button 17L1, an L2 button 17L2, an R1 button 17R1, an R2 button 17R2, a start button 17e, a select button 17f, a left stick 17SL, and a right stick 17SR.

The up-direction key 17U, down-direction key 17D, left-direction key 17L, and right-direction key 17R are used for, e.g., giving commands to the CPU 7 to move a character or cursor up, down, left, or right on the screen of the television monitor 20.

The start button 17e is used for instructing the CPU 7 to load a game program from the recording medium 10, and is used for other purposes.

The select button 17f is used for instructing the CPU 7 to make various selections in the game program loaded from the recording medium 10, and is used for other purposes.

The left stick 17SL and right stick 17SR are stick controllers, which have substantially the same configuration as a so-called joystick. The stick controllers have upright sticks. The sticks can be tilted in all directions 360°, including the forward, rearward, right, and left directions from the upright position about the center of the point of support. The left stick 17SL and right stick 17SR send to the CPU 7 the values of the x and y coordinates as an operation signal using the upright position as the origin by way of the operation information interface circuit 18 and interface circuit 19 in accordance with the tilt direction and tilt angle of the stick.

The first button 17a, second button 17b, third button 17c, fourth button 17d, L1 button 17L1, L2 button 17L2, R1 button 17R1, and R2 button 17R2 are assigned various functions in accordance with the game program loaded from the recording medium 10.

The buttons and keys of the controller 17, excluding the left stick 17SL and the right stick 17SR, are each on/off switches that are on when pressed from the neutral position by external pressing force and are off when the pressing force is released and the button or key returns to its neutral position.

The communication unit 23 has a communication control circuit 24 and a communication interface 25. The communication control circuit 24 and the communication interface 25 are used for connecting the game apparatus to servers or other game apparatus, or the like. The communication control circuit 24 and the communication interface 25 are connected to the CPU 7 through the bus 6. The communication control circuit 24 and the communication interface 25 control and send out a connection signal for connecting the game apparatus to the internet, in accordance with a command from the CPU 7. Furthermore, the communication control circuit 24 and the communication interface 25 control and send out a connection signal for connecting the game apparatus to servers or other game apparatuses through the internet.

The overall operation of the home video game apparatus having the above configuration will be described below. When the power switch (not shown) is turned on and power is fed to the game system, the CPU 7 reads image data, audio data, and program data from the recording medium 10 on the basis of the operating system stored in the recording medium 10. All or a part of the image data, audio data, and program data read is stored in the RAM 12. The CPU 7 issues commands for outputting image data and audio data stored in the RAM 12 as an image or audio output to the television monitor 20 or the speaker 13, on the basis of the program data stored in the RAM 12.

In the case of image data, first, the signal processor 8 performs position and light source calculations, and the like, of a character, in a 3D space on the basis of commands from the CPU 7. Next, the image processor 9 writes to the RAM 12, based on the calculation results of the signal processor 8, image data that is to be drawn. Image data written to the RAM 12 is fed to the D/A converter 22 through the interface circuit 21. At this point, the image data is converted to an analog image signal in the D/A converter 22. The image data is fed to the television monitor 20 and displayed as an image.

In the case of audio data, first the signal processor 8 generates and processes audio data on the basis of commands from the CPU 7. In this case, audio data is processed, and processing includes, e.g., pitch conversion, noise addition, envelope setting, level setting, and reverberation addition. Next, the audio data is outputted from the signal processor 8 and fed to the D/A converter 15 through the interface circuit 16. At this point, the audio data is converted to an analog audio signal. The audio data is outputted as audio from the speaker 13 through the amplifier circuit 14.

Overview of Various Processes in the Game Apparatus

Figure 2:
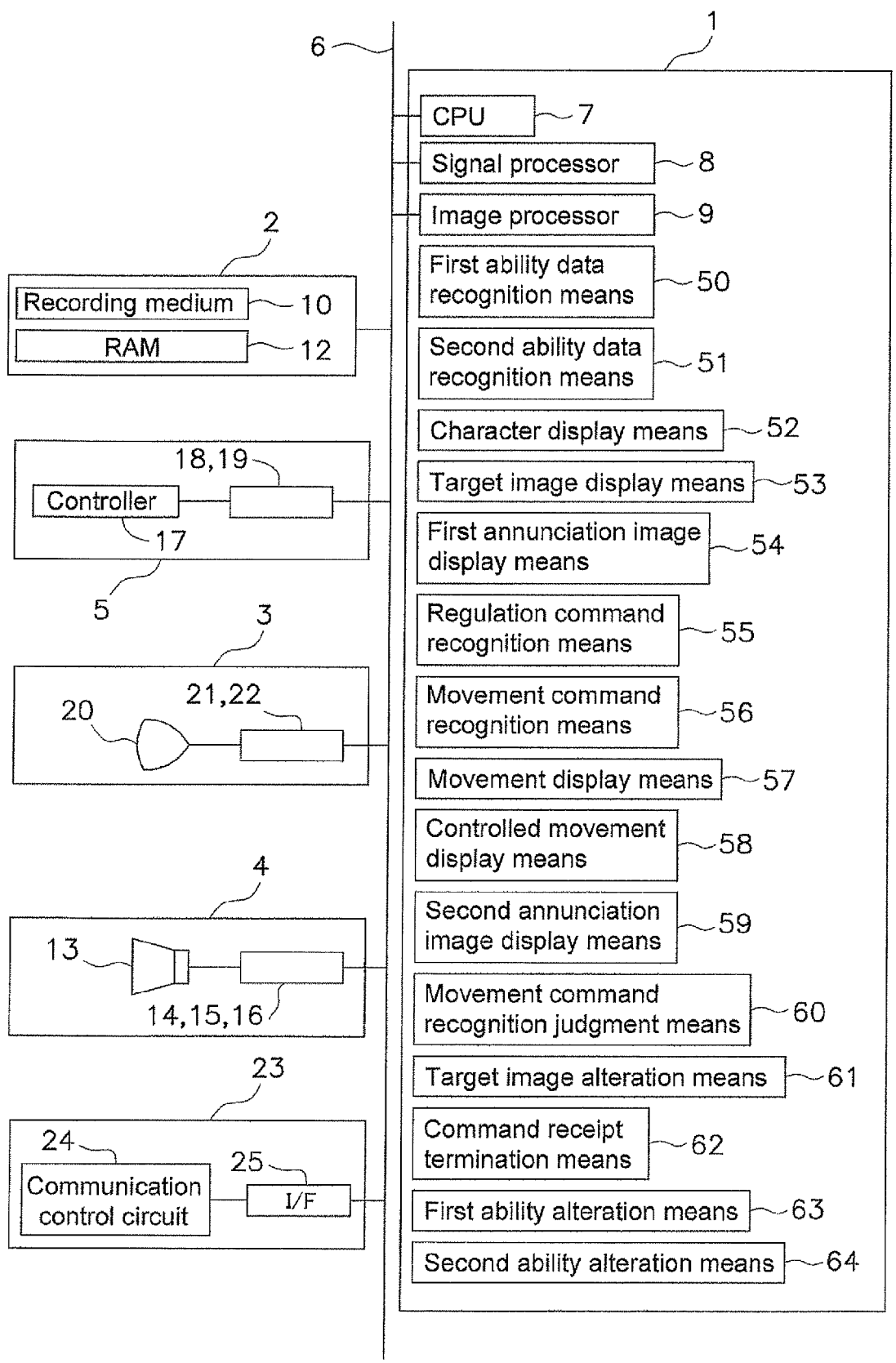
FIG. 2 is a function block diagram of the game apparatus.

The game program implemented in the present game machine is, for example, a baseball game program. By activating this baseball game program, a batter character and a pitcher character are displayed on the television monitor 20. For instance, a pitching movement of the pitcher character and a swing movement of the batter character are displayed on the television monitor 20, based on a command from the CPU 7. FIG. 2 is a function block diagram used for describing functions that play principal roles in the present invention.

A first ability data recognition means (unit) 50 includes a function whereby ability data that shows the ability of a batter character is recognized in the CPU 7. With the first ability data recognition means 50, the ability data that shows the ability of a batter character is recognized in the CPU 7.

With this means, ability data that shows the ability of a batter character stored in the RAM 12, for instance ability data that shows the corresponding ability of a batter character for each course, is recognized in the CPU 7. The initial data of this ability data is loaded in the RAM 12 from the recording medium 10 when the game program is loaded, and stored in the RAM 12. In addition, if the ability data is altered, the altered ability data is stored in the RAM 12. In this configuration, the ability data stored in the RAM 12 in this manner is recognized in the CPU 7.

A second ability data recognition means (unit) 51 includes a function whereby ability data that shows the ability of a pitcher character is recognized in the CPU 7. With the second ability data recognition means 51, the ability data that shows the ability of a pitcher character is recognized in the CPU 7.

With this means, ability data that shows the ability of a pitcher character stored in the RAM 12, for instance ability data corresponding to the strength of a ball that a pitcher character pitches, is recognized in the CPU 7. The initial data of this ability data is loaded in the RAM 12 from the recording medium 10 when the game program is loaded, and stored in the RAM 12. In addition, if the ability data is altered, the altered ability data is stored in the RAM 12. In this configuration, the ability data stored in the RAM 12 in this manner is recognized in the CPU 7.

A character display means (unit) 52 includes a function for displaying a batter character and a pitcher character on the television monitor 20 using the image data. With the character display means 52, the batter character and the pitcher character are displayed on the television monitor 20 using the image data.

With this means, the batter character is displayed on the television monitor 20 using the batter image data. In addition, the pitcher character is displayed on the television monitor 20 using the pitcher image data. The batter image data and the pitcher image data used here are loaded in the RAM 12 from the recording medium 10 when the game program is loaded, and stored in the RAM 12.

A target image display means (unit) 53 includes a function for displaying a target image that shows the target when the batter character performs a swing movement on the television monitor 20 using the target image data. With the target image display means 53, the target image that shows the target when a batter character performs a swing movement is displayed on the television monitor 20 using the target image data.

With this means, the target, for instance the meet zone, when the batter character performs a swing movement is displayed on the television monitor 20 using the meet zone image data. Furthermore, the meet zone shown on the television monitor moves on the television monitor 20, when a movement command for moving the meet zone is issued from the CPU 7. For example, when a player operates at least one of the keys of any of the up-direction key 17U, down-direction key 17D, left-direction key 17L, or the right-direction key 17R of the controller 17, the movement command is recognized in the CPU 7. As a result, according to the number of times of the operation of the key of the controller 17, the meet zone moves up, down, left, or right on the screen of the television monitor 20.

A first annunciation image display means (unit) 54 includes a function for displaying a first annunciation image for informing the ability of a batter character on the television monitor 20 based on the ability data of the batter character. In the first annunciation image display means 54, the function for displaying the first annunciation image for informing the ability of a batter character on the television monitor 20 based on the ability data of the batter character is included.

With this means, the first annunciation image for informing the ability of the batter character, for instance, a first annunciation image for informing the courses that the batter character is good at and poor at, is displayed on the television monitor 20 using the image data of the first annunciation image, based on the ability data that shows the corresponding ability of the batter character for each course. In addition, the image data of the first annunciation image used here is loaded in the RAM 12 from the recording medium 10 when the game program is loaded, and stored in the RAM 12.

A regulation command recognition means (unit) 55 includes a function whereby a regulation command for regulating a swing movement of the batter character is recognized in the CPU 7. With the regulation command recognition means 55, the regulation command for regulating a swing movement of the batter character is recognized in the CPU 7.

With this means, a swing regulation command, for instance, a send-off command, for regulating a swing movement of the batter character is recognized in the CPU 7. For example, if the player controls the batter character, and if the player operates the controller 17 for instructing a send-off command on the batter character, an input signal is issued from the controller 17. The send-off command corresponding to this input signal is then recognized in the CPU 7. Therefore, the batter character does not swing the bat. On the other hand, in the case that an AI Program (Artificial Intelligence Program) is controlling the batter character, the send-off command based on the AI Program is recognized in the CPU 7.

Furthermore, the AI Program indicated here is a program used for automatically controlling a baseball game. For example, the AI Program is composed of a program for automatically controlling an event, a program for automatically controlling the batter character, a program for automatically controlling the pitcher character, and the like. This AI Program is loaded in the RAM 12 from the recording medium 10 when the game program is loaded, and stored in the RAM 12.

A movement command recognition means (unit) 56 includes a function whereby a movement command for operating the pitcher character, after a swing regulation command on the batter character is recognized in the CPU 7, is recognized in the CPU 7. With the movement command recognition means 56, after a swing regulation command on the batter character is recognized in the CPU 7, a movement command for operating the pitcher character is recognized in the CPU 7.

With this means, after a send-off command on the batter character is recognized in the CPU 7, a movement command for operating the pitcher character, for example, a movement commend on the pitching of the pitcher character (pitching related command), is recognized in the CPU 7.

For example, if the rival player is controlling the pitcher character, after a send-off command on the batter character is recognized in the CPU 7, if the rival player operates the controller 17 for instructing a pitching related command on the pitcher character, an input signal is issued from the controller 17. The pitching related command corresponding to this input signal is then recognized in the CPU 7. On the other hand, in the case that the AI Program is controlling the pitcher character, the pitching related command based on the AI Program is recognized in the CPU 7.

In addition, the pitching related command is composed of a pitch indication command for indicating the type of pitch, a pitching starting command for instructing the start of the pitching, a course indication command for indicating the pitching course, a release command for instructing the release of the ball, and the like.

A movement display means (unit) 57 includes a function for displaying the state of the movement of the pitcher character using the pitcher image data on the television monitor 20 based on the pitching related command. With the movement display means 57, the state of the movement of the pitcher character is displayed on the television monitor 20 using the pitcher image data, based on the pitching related command.

With this means, the state of the movement of the pitcher character is displayed on the television monitor 20 using the pitcher image data, based on the pitching related command. For example, after the pitch indication command is recognized in the CPU 7, if a pitching starting command is recognized in the CPU 7, the state of the pitcher character starting the pitching movement and the pitcher character performing the pitching movement is displayed on the television monitor 20. If the release command is recognized in the CPU 7 after the course indication command is recognized in the CPU 7, the state of the pitcher character releasing the ball and the pitcher character in follow-through will be displayed on the television monitor 20.

A controlled movement display means (unit) 58 includes a function for displaying the batter character with the swing movement thereof controlled on the television monitor 20, using the batter image data, based on the send-off command. With the controlled movement display means 58, the batter character with the swing movement thereof controlled is displayed on the television monitor 20 using the batter image data, based on the send-off command.

With this means, the batter character in the send-off movement is displayed on the television monitor 20 using the batter image data, based on the send-off command on the batter character. For example, when the state of the movement of the pitcher character is displayed on the television monitor 20 based on the pitching related command, the batter character in the ready posture at the plate is displayed on the television monitor 20 based on the send-off command on the batter character.

A second annunciation image display means (unit) 59 includes a function for displaying a second annunciation image for informing the ability of the pitcher character on the television monitor 20 based on the ability data of the pitcher character. With the second annunciation image display means 59, a second annunciation image for informing the ability of the pitcher character is displayed on the television monitor 20 based on the ability data of the pitcher character.

With this means, the second annunciation image for informing the ability of the pitcher character, for example, the second annunciation image for informing the strength of the ball that the pitcher character pitches, is displayed on the television monitor 20 using the image data for the second annunciation image, based on the ability data corresponding to the strength of the ball that the pitcher character pitches. In addition, the image data for the second annunciation image used here is loaded in the RAM 12 from the recording medium 10 when the game program is loaded, and is stored in the RAM 12.

A movement command recognition judgment means (unit) 60 includes a function whereby whether or not a movement command for making the batter character perform a swing movement is recognized in the CPU 7 is judged by the CPU 7, when the batter character with the swing movement thereof controlled is displayed on the television monitor 20 using the image data, based on the send-off command.

With the movement command recognition judgment means 60, whether or not a movement command for making the batter character perform a swing movement is recognized in the CPU 7 is judged by the CPU 7, when the batter character with the swing movement thereof controlled is displayed on the television monitor 20 using the image data, based on the send-off command.

With this means, when the batter character in the send-off movement is displayed on the television monitor 20 using the image data, based on the send-off command on the batter character, whether or not the movement command for making the batter character perform a swing movement (batting related command) is recognized in the CPU 7 is judged by the CPU 7. For example, based on the send-off command on the batter character, when the batter character in the ready posture at the plate is displayed on the television monitor 20, whether or not the batting related command is recognized in the CPU 7 is judged by the CPU 7.

In addition, the batting related command is composed of a meet zone moving command for moving the meet zone, a swing starting command for instructing the start of the swing, and the like. In this configuration, when the batter character in the ready posture at the plate is displayed on the television monitor 20, whether or not the swing starting command is recognized in the CPU 7 is judged by the CPU 7.

A target image alteration means (unit) 61 includes a function whereby a process for altering the image data for the meet zone so that the meet zone becomes smaller is executed by the CPU 7 if the batting related command is recognized in the CPU 7.

With the target image alteration means 61, if the batting related command is recognized in the CPU 7, the process for altering the image data for the meet zone so that the meet zone becomes smaller is executed by the CPU 7.

With this means, if the batting related command for the batter character is recognized in the CPU 7, the process for altering the image data for the meet zone so that the meet zone becomes smaller is executed by the CPU 7. For example, despite that the send-off command for the batter character is instructed, in the case that the batting related command, which is a command contrary to the send-off command for the batter character, is instructed, the process that is unfavorable to the batter, in other words, the process that changes the image data for the meet zone so that the meet zone becomes smaller, is executed by the CPU 7.

A command receipt termination means (unit) 62 includes a function whereby the receiving of commands on the movements for the batter character and the pitcher character is terminated by the CPU 7. With the command receipt termination means 62, the receiving of the commands on the movements for the batter character and the pitcher character is terminated by the CPU 7.

With this means, the receiving of the commands on the movements for the batter character and the pitcher character is terminated by the CPU 7. More specifically, when a flag that shows whether or not one play (event) has been ended is recognized by the CPU 7, the receiving of commands on the movements for the batter character and the pitcher character is terminated by the CPU 7. That is, even if a command on the movement for the batter character and the pitcher character is instructed, this command is rejected by the CPU 7.

A first ability alteration means (unit) 63 includes a function whereby a process for altering the ability data of the batter character is executed by the CPU 7 in the case that the receiving of the commands on the movements for the batter character and the pitcher character is terminated by the CPU 7. The first ability alteration means 63 includes a function whereby a process for altering the ability data so that the ability of the batter character becomes higher is executed by the CPU 7, in the case that the batting related command for the batter character is not recognized in the CPU 7 and the receiving of the commands on the movements for the batter character and the pitcher character is terminated by the CPU 7.

With the first ability alteration means 63, a process for altering the ability data so that the ability of the batter character becomes higher is executed by the CPU 7, in the case that the batting related command for the batter character is not recognized in the CPU 7 and the receiving of the commands on the movements for the batter character and the pitcher character is terminated by the CPU 7.

With this means, the process for changing the ability data so that the corresponding ability of the batter character for each course becomes higher is executed by the CPU 7, in the case that the batting related command for the batter character is not recognized in the CPU 7 and the receiving of commands on the movements for the batter character and the pitcher character is terminated by the CPU 7.

For instance, in the state that the batter character in the ready posture at the plate is displayed on the television monitor 20 and if the flag for showing whether or not one play has been ended is erected is recognized by the CPU 7, the process for changing the ability data so that the corresponding ability of the batter character for each course becomes higher is executed by the CPU 7.

A second ability alteration means (unit) 64 includes a function whereby a process for changing the ability data of the pitcher character is executed by the CPU 7 in the case that the receiving of commands on the movements for the batter character and the pitcher character is terminated by the CPU 7. The second ability alteration means 64 includes a function whereby the process for changing the ability data so that the ability of the pitcher character becomes lower is executed by the CPU 7 in the case that the batting related command for the batter character is not recognized in the CPU 7 and the receiving of the commands on the movements for the batter character and the pitcher character is terminated by the CPU 7.

With the second ability alteration means 64, the process for changing the ability data so that the ability of the pitcher character becomes lower is executed by the CPU 7 in the case that the batting related command for the batter character is not recognized in the CPU 7 and the receiving of the commands on the movements for the batter character and the pitcher character is terminated by the CPU 7.

With this means, the process for changing the ability data so that the strength of the ball that the pitcher character pitches becomes smaller is executed by the CPU 7, in the case that the batting related command for the batter character is not recognized in the CPU 7 and the receiving of the commands on the movements for the batter character and the pitcher character is terminated by the CPU 7.

For instance, in the state that the batter character in the ready posture at the plate is displayed on the television monitor 20, and if the flag that shows whether or not one play has been ended is erected is recognized by the CPU 7, the process for changing the ability data so that the strength of the ball that the pitcher character pitches becomes weaker is executed by the CPU 7.

Figure 7:
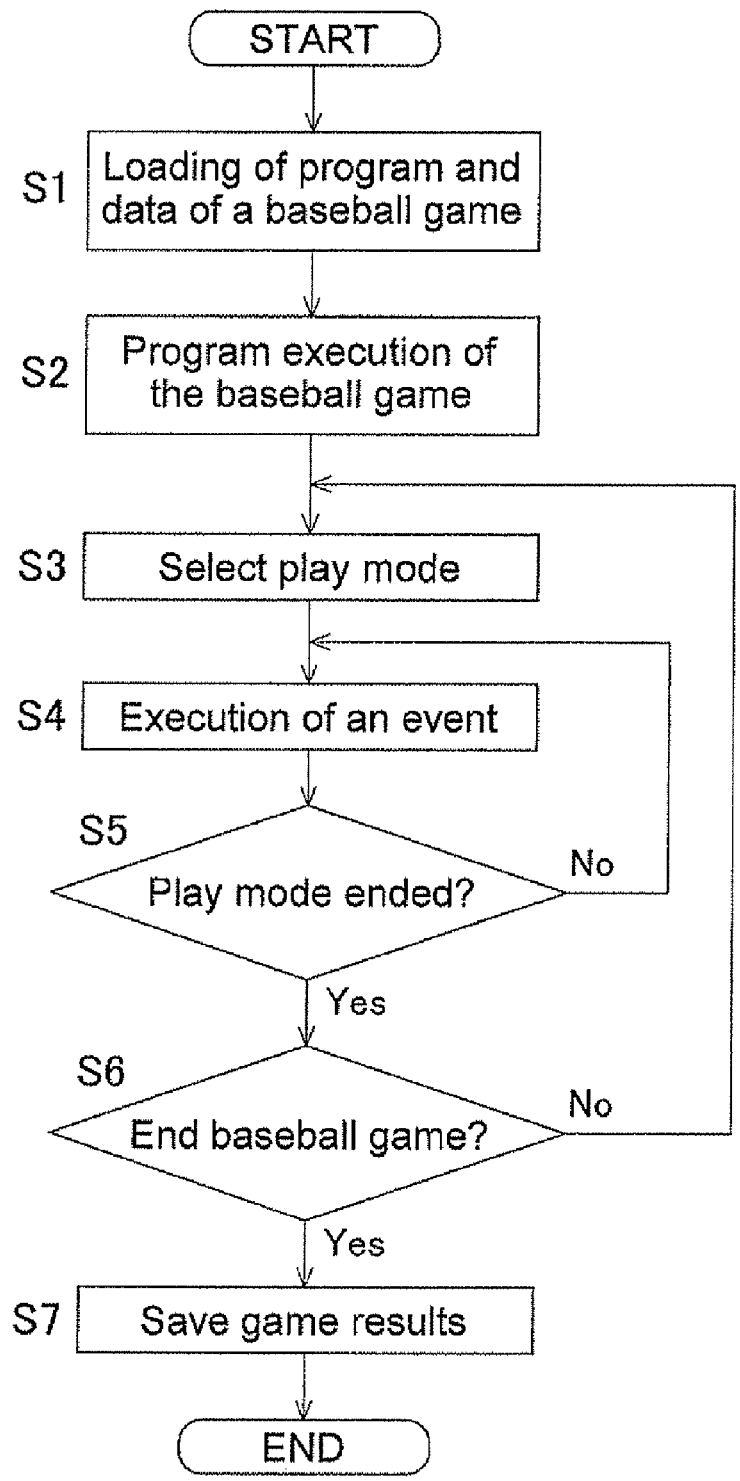
FIG. 7 is a flow showing the overall outline of a baseball game.
Figure 8A:
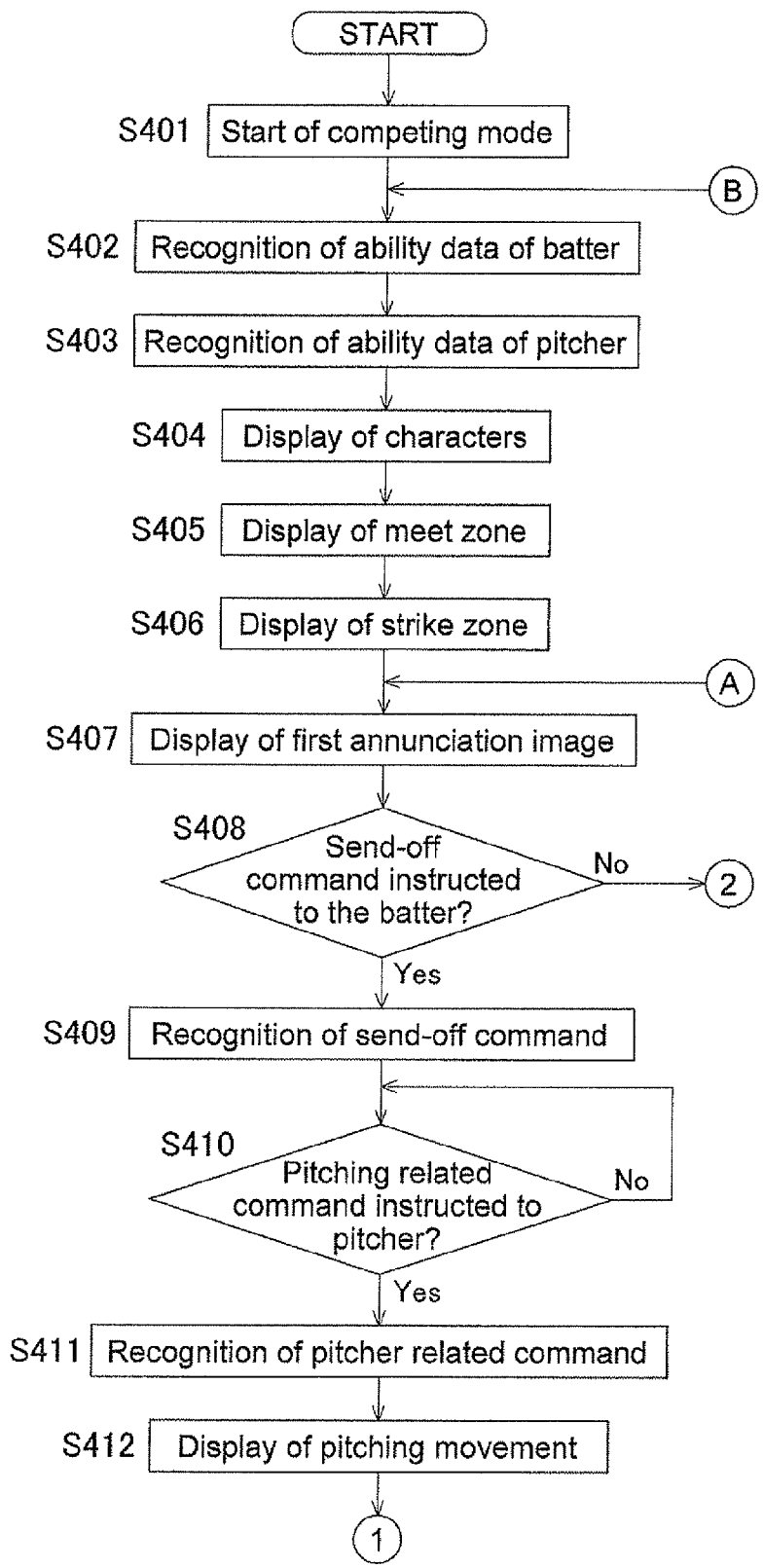
FIG. 8A is a flow showing a player intention reflection system in a baseball game.
Figure 8B:
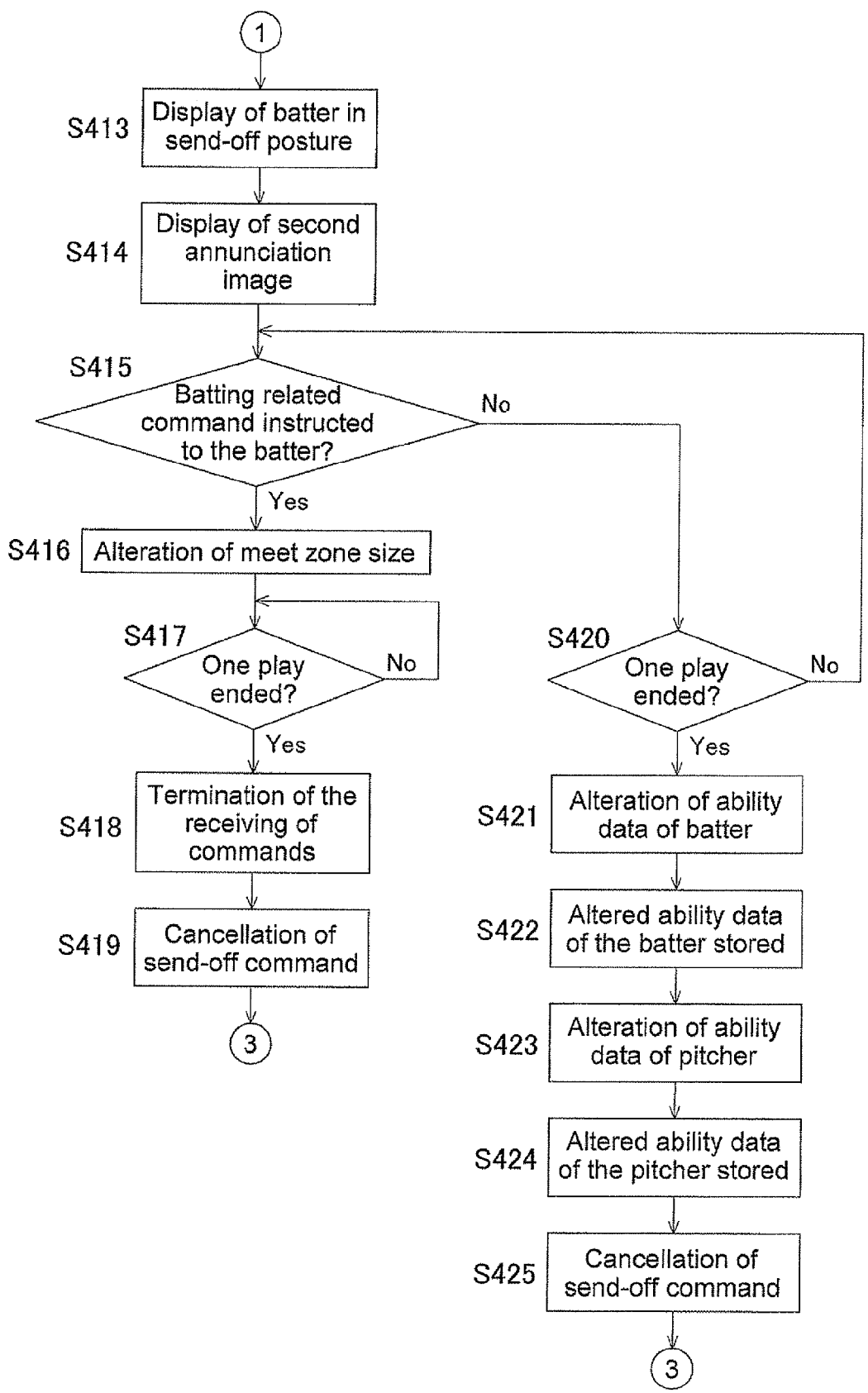
FIG. 8B is a flow showing a player intention reflection system in a baseball game.
Figure 8C:
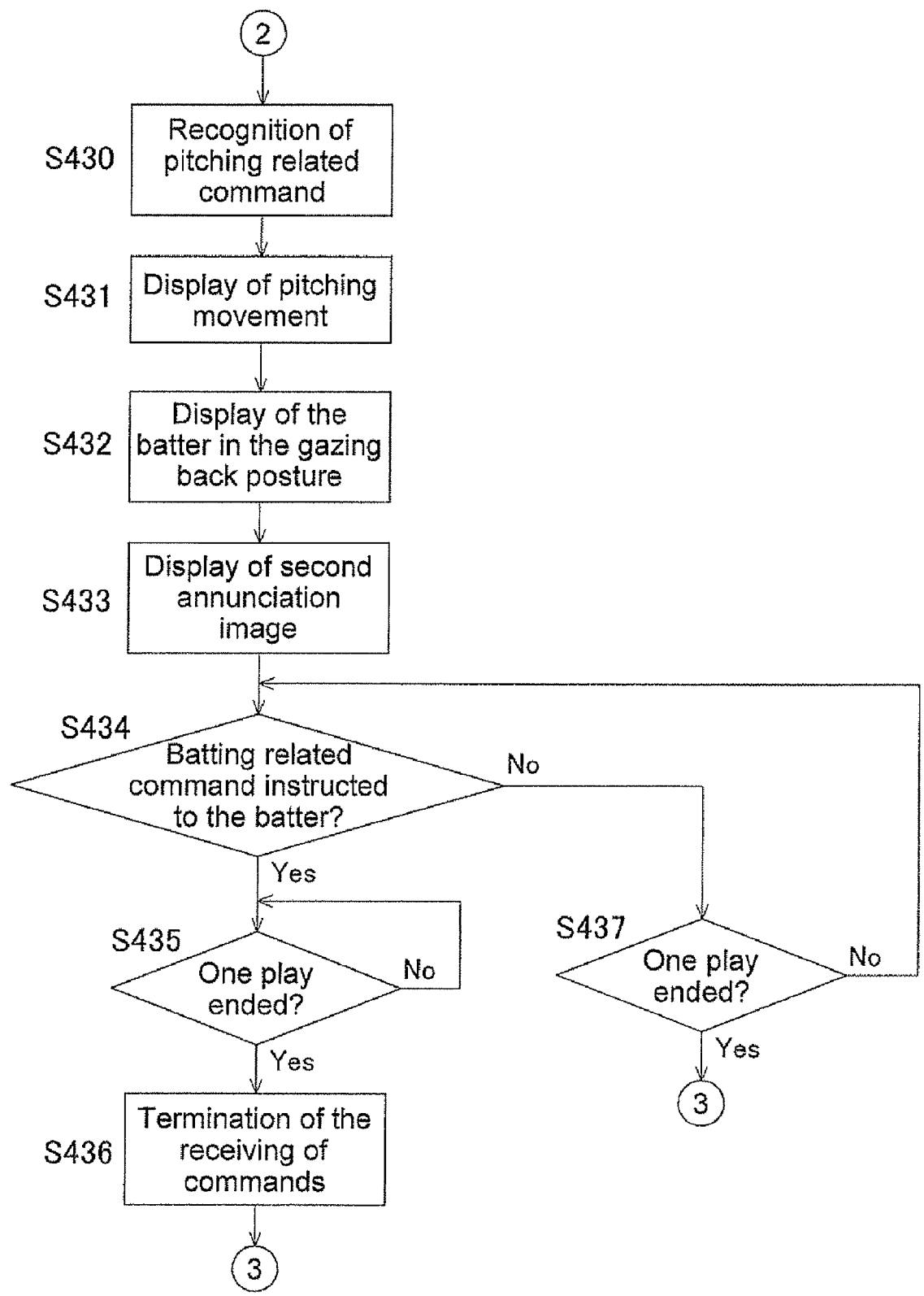
FIG. 8C is a flow showing a player intention reflection system in a baseball game.
Figure 8D:
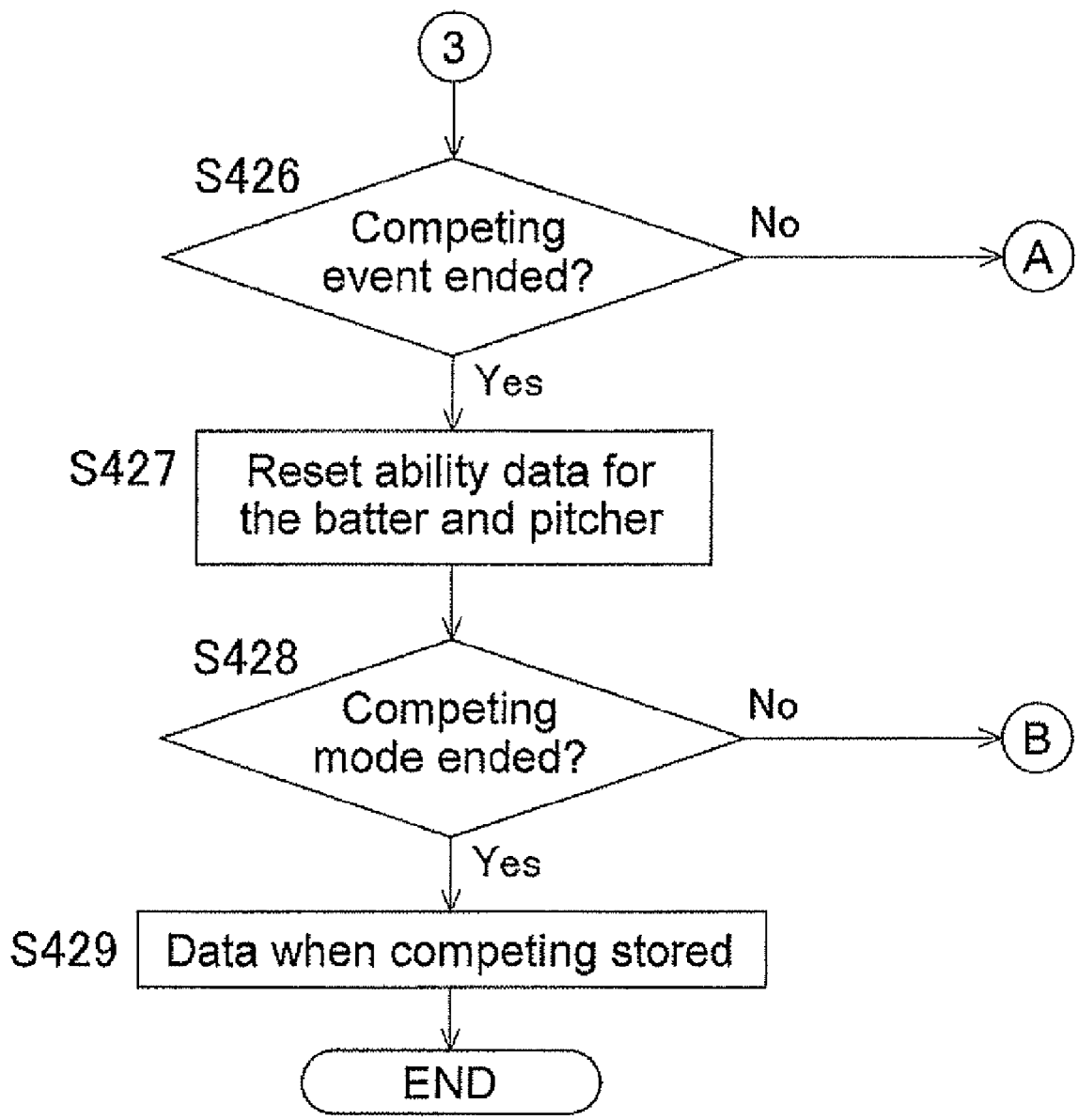
FIG. 8D is a flow showing a player intention reflection system in a baseball game.

Process Flow and Description of a Player Intention Reflection System in a Baseball Game Next, a player intention reflection system in a baseball game will be described. In addition, the flow diagrams shown in FIGS. 7 and 8 will also be described at the same time. Furthermore, FIG. 7 is a flow diagram for describing the overall summary of a baseball game, and FIG. 8 is a flow diagram for describing the player intention reflection system.

First, when the power of the game machine is turned on and the game machine is initiated, a baseball game program is loaded and stored in the RAM 12 from the recording medium 10. At this time, various basic game data necessary for executing a baseball game are also loaded and stored in the RAM 12 from the recording medium 10 at the same time (S1).

For example, basic game data include data for various images used in a 3D game space. Data on the various images used in the 3D game space, for instance, image data for the stadium, image data for the player characters, image data of various objects, and the like are recognized by the CPU 7. In addition, the basic game data include positional coordinate data for disposing the data on the various images used in the 3D game space in a 3D game space. Furthermore, the basic game data also include data used in the player intention reflection system.

Next, a baseball game program stored in the RAM 12 is executed by the CPU 7 based on the basic game data (S2). By doing so, a start-up screen of a baseball game is displayed on the television monitor 20. Various setting screens for executing the baseball game are displayed on the television monitor 20. In this case, for instance, a mode selection screen for selecting the play mode of the baseball game is displayed on the television monitor 20 (not shown). In this mode selection screen, the player decides the play mode by operating the controller 17 (S3). Play modes that are available are, for example, a competing mode in which one match of a game is played by selecting a team of choice from twelve teams, a pennant mode in which a pennant race is competed by selecting a team of choice from twelve teams, a fostering mode for fostering a player character of a team with the player in the director position, and the like.

Next, in a play mode selected in a mode selection screen, various events are executed by the CPU 7 (S4). The various events executed here include events like, for example, an event automatically controlled by the CPU 7 based on the AI Program, and an event manually controlled by the player based on an input signal from the controller 17. In addition, the control of the player character includes automatic control for automatically indicating a command on the player character based on the AI Program, manual control for directly indicating a command on the player character based on an input signal from the controller 17, and the like. In this manner, in this baseball game, an event is controlled according to the instruction from the controller 17 and the instruction from the AI Program, and a command is indicated and given to the player character.

Next, whether or not the selected play mode has been ended is judged by the CPU 7 (S5). More specifically, whether or not a command that shows that the play mode has been ended is issued is judged by the CPU 7. If the CPU 7 judged that a command that shows that the play mode has been ended is issued (Yes in S5), the process of storing the data used for continuing the game in the RAM 12 is executed by the CPU 7. When the data used for continuing the game is stored in the RAM 12, a selection screen for selecting whether or not to end the baseball game is displayed on the television monitor 20 (S6). Then, in this selection screen, if the player operates the controller 17 to select an item indicating to end the baseball game (YES in S6), the process for ending the baseball game is executed by the CPU 7 (S7). On the other hand, in this selection screen, if the player operates the controller 17 to select an item indicating to continue the baseball game (No in S6), the mode selection screen in Step 3 (S3) is displayed on the television monitor 20 again.

In addition, as long as the issuance of a command for ending the play mode is not determined in the CPU 7 (No in S5), in the play mode selected on the mode selection screen, various events are executed by the CPU 7 (S4).

Next, a player alternation system will be described in detail.

An example of the case that the player intention reflection system is executed in the competing mode is shown below. The competing mode on the mode selection screen is being selected, for instance, and when a game event is executed in the competing mode, an example when the player intention reflection system functions is shown. In addition, an example of a case of an A player (self player) and a B player (opponent player) competing against each other, and the A player indicates a command on a batter character 70 is shown.

If the competing mode on the mode selection screen is selected by the A player or B player, the competing mode is executed by the CPU 7 (S401). As a result, the ability data showing the ability of the batter character 70, for example, ability data N1 ($n$) showing the corresponding ability of the batter character 70 for each course, stored in the RAM 12 is recognized by the CPU 7 (S402).

Figure 3:
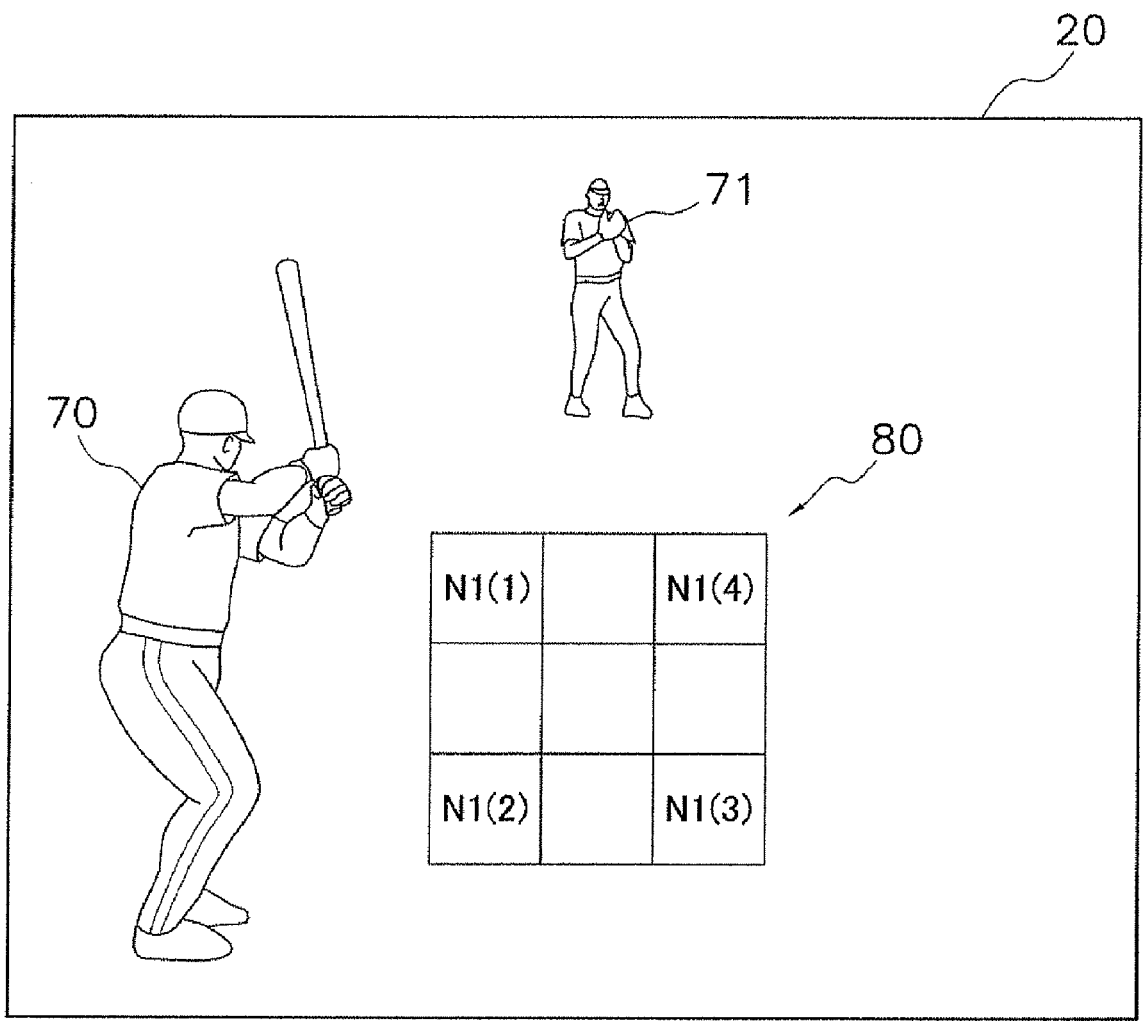
FIG. 3 is a diagram that shows the ability data of a batter corresponding to each course.

Here, n is a variable corresponding to the position of each course, and n is a natural number equal to or greater than "1" and equal to or less than "4". For example, as shown in FIG. 3, when the batter is a right-handed batter, the ability data showing the corresponding ability for a high and inside is expressed by "N1 (1)". In addition, the ability data showing the corresponding ability for an inside low is expressed by "N1 (2)". The ability data showing the corresponding ability for a down and away is expressed by "N1 (3)". The ability data showing the corresponding ability for a high and outside is expressed by "N1 (4)".

Here, as the corresponding ability of the batter character 70 for the courses, five levels of corresponding ability of "very poor at", "little poor at", "normal", "little good at", and "very good at" are available. For example, the corresponding ability of the batter character 70 for each of the four courses of high and inside, low and inside, low and outside, and high and outside is set to be one of any of "very poor at", "little poor at", "normal", "little good at", and "very good at".

More specifically, a numeric value "1" is assigned by the CPU 7 to the ability data N1 ($n$) of the course that is "very poor at". A numeric value "2" is assigned by the CPU 7 to the ability data N1 ($n$) of the course that is "little poor at". In addition, a numeric value "3" is assigned by the CPU 7 to the ability data N1 ($n$) of the course that is "normal". Furthermore, a numeric value "4" is assigned by the CPU 7 to the ability data N1 ($n$) of the course that is "little good at". Moreover, a numeric value "5" is assigned by the CPU 7 to the ability data N1 ($n$) of the course that is "very good at". The values of the ability data N1 ($n$) corresponding to the corresponding ability of the batter character 70 for these courses are specified in advance in the game program.

The courses that the batter character 70 is good at and poor at are identified by the CPU 7, by this kind of values of the ability data N1 ($n$) of the four courses recognized by the CPU 7. In addition, in this configuration, the ability data N1 ($n$) used in the beginning and stored in the RAM 12 is recognized by the CPU 7.

Then, the ability data showing the ability of a pitcher character 71, for instance, ability data N2 corresponding to the strength of the ball that the pitcher character 71 pitches, stored in the RAM 12 is recognized by the CPU 7 (S403).

In this case, the strength of the ball that the pitcher character 71 throws is available in five levels of "weakest strength", "little strength", "normal", "great strength", and "greatest strength". For example, until the pitcher character 71 releases the ball, the strength of the ball that the pitcher character 71 throws is set to be one of any of "weakest strength", "little strength", "normal", "great strength", and "greatest strength".

More specifically, the ability data N2 of the pitcher character 71 who throws a ball with the "weakest strength" is assigned a numeric value of "1" by the CPU 7. The ability data N2 of the pitcher character 71 who throws a ball with "little strength" is assigned a numeric value of "2" by the CPU 7. In addition, the ability data N2 of the pitcher character 71 who throws a ball that is "normal" is assigned a numeric value of "3" by the CPU 7. Furthermore, the ability data N2 of the pitcher character 71 who throws a ball with "great strength" is assigned a numeric value of "4" by the CPU 7. And, the ability data N2 of the pitcher character 71 who throws a ball with the "greatest strength" is assigned a numeric value of "5" by the CPU 7. The values of the ability data N2 of the pitcher character 71 corresponding to these strengths are specified in advance in the game program.

The strength of the ball that the pitcher character 71 is able to throw is identified by the CPU 7, by this kind of values of the ability data N2 corresponding to the strengths of the ball recognized by the CPU 7. In addition, in this configuration, the ability data N1 ($n$) used in the beginning and stored in the RAM 12 is recognized by the CPU 7.

Figure 4:
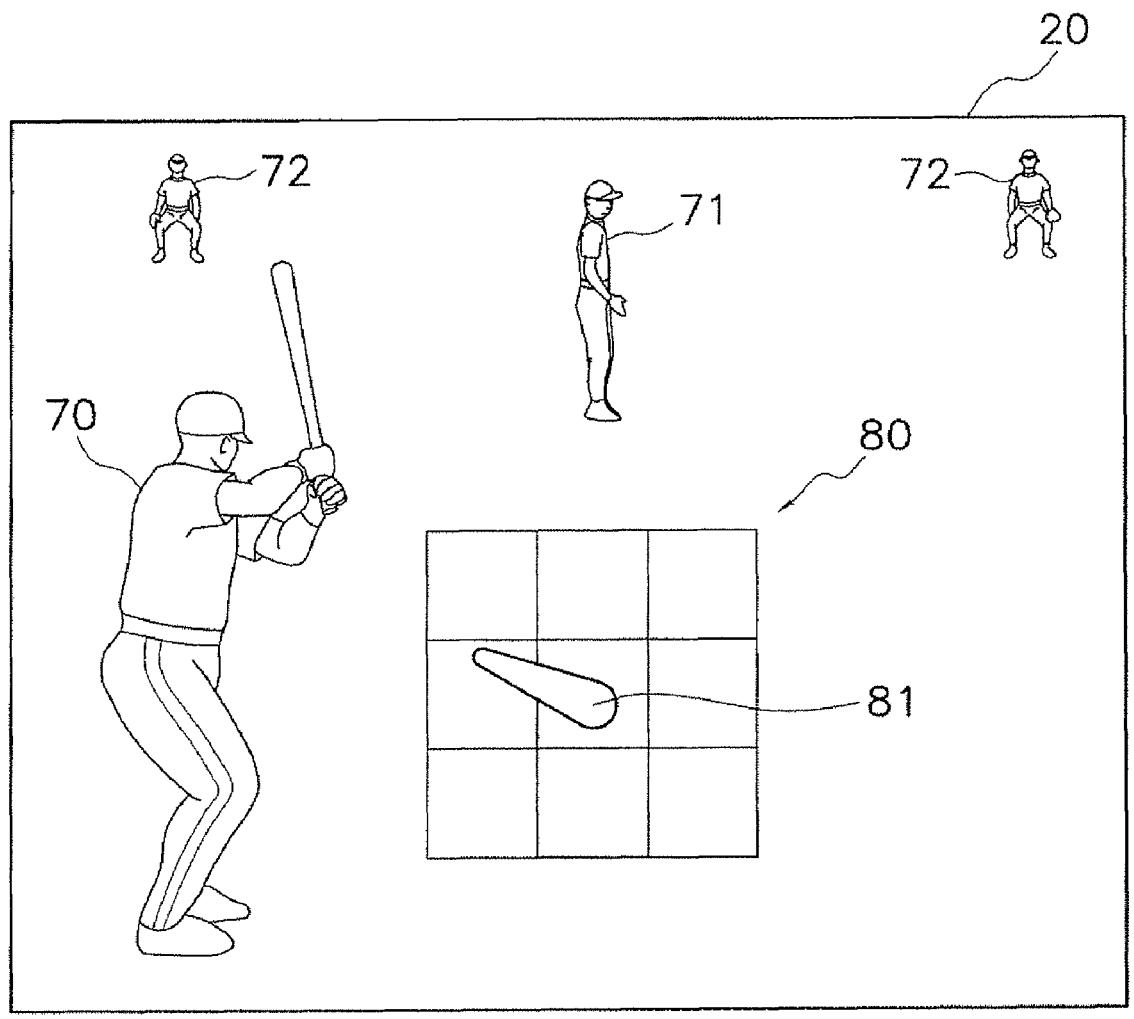
FIG. 4 is a diagram for describing an object displayed on a television monitor before pitching.

Next, as shown in FIG. 4, the pitcher character 71, the fielder character 72, and the batter character 70 are displayed on the television monitor 20 using the image data (S404). In addition, the meet zone 81 corresponding to the mark when the batter character 70 performs the swing movement is displayed on the television monitor 20 using the image data for the meet zone (S405). In this state, when a movement command for moving the meet zone 81 is instructed from the controller 17 of the A player, the meet zone 81 moves on the television monitor 20 in the operation direction of the controller 17.

Furthermore, the process of disposing the plane on which the meet zone 81 moves (hitting plane) in a specified position in the 3D game space is executed by the CPU 7. The hitting plane is also the plane on which the moving direction of the ball released from the pitcher character 71 changes, when the ball released from the pitcher character 71 is hit back by the swing movement of the batter character 70. The strike zone 80 set on this kind of a hitting plane is displayed on the television monitor 20 (S406). In addition, the position and the range of the hitting plane and the position and the range of the strike zone 80 are specified in advance in the game program.

Next, the first annunciation image 82 informing the ability of the batter character 70, for example, the first annunciation image 82 informing the courses that the batter character 70 is good at and poor at is displayed on the television monitor 20 using the image data for the first annunciation image, based on the ability data N1 ($n$) showing the corresponding ability of the batter character 70 for each course (S407).

Figure 5:
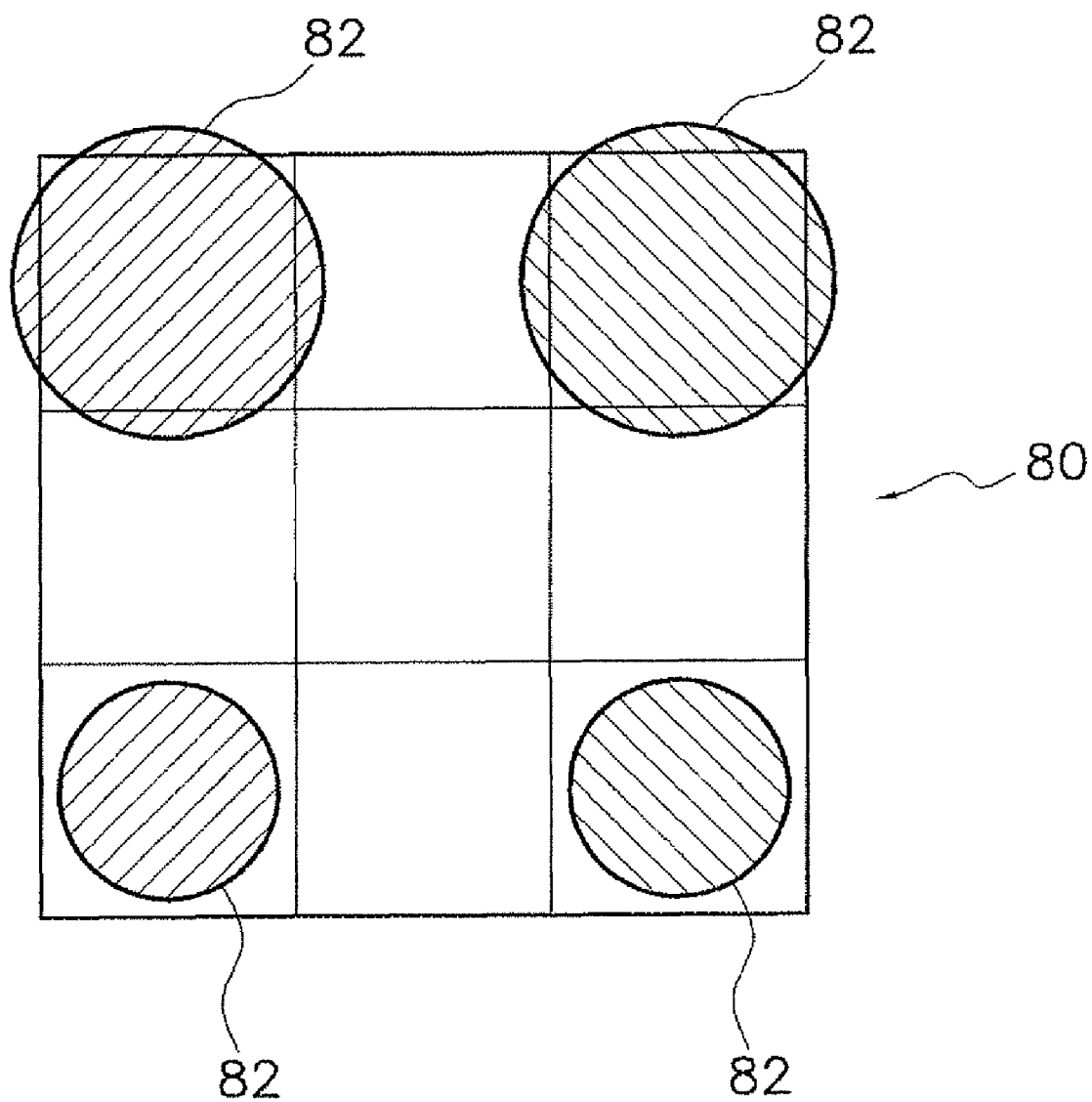
FIG. 5 is a diagram for describing a first annunciation image.

Here, the first annunciation image 82, as shown in FIG. 5, is set to the courses of the four corners of the strike zone 80, and changes according to the ability data N1 ($n$) of the batter character 70. For example, if corresponding ability of the batter character 70 is high for a particular course, the image data in which the color of this course becomes red is recognized by the CPU 7 (high and inside and low and inside in FIG. 5). By using this image data, the first annunciation image 82 informing the course that the corresponding ability of the batter character 70 is high is displayed on the television monitor 20. On the other hand, if the corresponding ability of the batter character 70 is low for a particular course, the image data in which the color of this course becomes blue is recognized by the CPU 7 (high and outside and low and outside in FIG. 5). Furthermore, by using this image data, the first annunciation image 82 informing the course that the corresponding ability of the batter character 70 is low is displayed on the television monitor 20.

In FIG. 5, an example of the case that the corresponding ability of the batter character 70 for high and inside, low and inside, low and outside, and high and outside being "very poor at", "little poor at", "little good at", and "very good at" is shown. In this FIG. 5, the blue regions are shown by diagonal lines slanting down from top right to the bottom left, and the red regions are shown by diagonal lines slanting down from top left to bottom right.

More specifically, if the corresponding ability of the batter character 70 for a particular course is "very poor at", that is, if the value of the ability data N1 ($n$) of the batter character 70 is "1", the course that is "very poor at" is informed on the television monitor 20 by a circular blue region (first region). Moreover, if the corresponding ability of the batter character 70 for a particular course is "little poor at", that is, if the value of the ability data N1 ($n$) of the batter character 70 is "2", the course that is "little poor at" is informed on the television monitor 20 by a circular blue region (second region) that is smaller than the first region.

That is, the lower the corresponding ability of the batter character 70 for a particular course, the bigger the circular blue region becomes. More specifically, the stronger the consciousness of the batter character 70 of being poor at a particular course, the greater the circular blue region becomes.

In the same way, if the corresponding ability of the batter character 70 for a particular course is "little good at", that is, if the value of the ability data N1 ($n$) of the batter character 70 is "4", the course that is "little good at" is informed on the television monitor 20 by a circular red region (third region). Moreover, if the corresponding ability of the batter character 70 for a particular course is "very good at", that is, if the value of the ability data N1 ($n$) of the batter character 70 is "5", it is informed on the television monitor 20 by a circular red region (fourth region) that is bigger than the third region.

In other words, the higher the corresponding ability of the batter character 70 for a particular course, the bigger the circular red region becomes. More specifically, the stronger the consciousness of the batter character 70 of being good at a particular course, the bigger the circular red region becomes.

In addition, if the corresponding ability of the batter character 70 for a particular course is "normal", that is, if the value of the ability data N1 (n) of the batter character 70 is "3", the course that is "normal" is informed on the television monitor 20 by using the image data in which the color of this course is colorless (same color as the background image). In this configuration, although an example of the case that the course that is "normal" is the same color as the background image is shown, the course that is "normal" may be informed by a color. Furthermore, in this configuration, although an example is shown of the case that course that is "normal" is informed using an image with the same color as the background image, the configuration may be to not show an image on the course that is "normal".

In addition, the images showing the corresponding ability of the batter character 70 for the courses are specified in advance in the game program. In this configuration, images of different colors and different sizes are prepared, according to the extent (very poor at, little poor at, normal, little good at, very good at) of the corresponding ability of the batter character 70 for the courses. The image data corresponding to the images are included in the basic game data.

Next, whether or not a swing regulation command for controlling the swing movement of the batter character 70, for example, a send-off command, has been given to the batter character 70 is judged by the CPU 7 (S408). If the CPU 7 judged that a send-off command has been given to the batter character 70 (Yes in S408), the send-off command given to the batter character 70 is recognized by the CPU 7 (S409). For example, if the A player operates the controller 17 in order to instruct the send-off command to the batter character 70, an input signal is issued from the controller 17. Then, the send-off command corresponding to this input signal is recognized by the CPU 7.

In this configuration, based on the input signal for the send-off command from the controller 17, the send-off command is recognized by the CPU 7. As a result, the send-off command is instructed to the batter character 70. More specifically, the process of erecting a flag for instructing the send-off command to the batter character 70 is executed by the CPU 7. The execution by the CPU 7 of the process of erecting this flag, that is, the process of making the value of the flag into "1" equivalents to an instruction of the send-off command to the batter character 70. In addition, the value of this flag being "1" equivalents to the batter character 70 having the intention of observing the ball carefully. In addition, the value of this flag is constantly monitored by the CPU 7, and whether or not the batter character 70 has the intention of observing the ball carefully in the game is judged by this value of the flag.

Next, if the send-off command is recognized by the CPU 7 (S409), whether or not a movement command for operating the pitcher character 71 is instructed to the pitcher character 71 is judged by the CPU 7 (S410). For example, if the value of the flag that shows whether or not there is an instruction of a send-off command is "1", whether or not a movement command related to the pitching of the pitcher character 71 (pitching related command) is instructed to the pitcher character 71 from the controller 17 is judged by the CPU 7. If the CPU 7 judged that the pitching related command to the pitcher character 71 has been instructed from the controller 17 (Yes in S410), the pitching related command to the pitcher character 71 is recognized by the CPU 7 (S411).

In this configuration, the pitching related command is composed of the pitch indication command for indicating the type of pitch, the pitching starting command for indicating the start of the pitching, the course indication command for indicating the pitching course, and the release command for indicating the release of the ball, and the like.

Next, if the pitching related command to the pitcher character 71 is recognized by the CPU 7 (S411), the state that the pitcher character 71 is moving is displayed on the television monitor 20 using the image data for the pitcher (S412). For example, after the pitch indication command is recognized by the CPU 7, if the pitching starting command is recognized in the CPU 7, the pitcher character 71 starts the pitching movement and the state that the pitcher character 71 is performing the pitching movement is displayed on the television monitor 20. After the course indication command is recognized by the CPU 7, if the release command is recognized by the CPU 7, the pitcher character 71 releases the ball, and the state of the pitcher character 71 in follow-through is displayed on the television monitor 20.

At this time, the batter character 70 in the posture corresponding to the send-off command (batter character 70 in the ready posture at the plate) is displayed on the television monitor 20 using the image data for the batter (S413). For example, when the state that the pitcher character 71 is moving is displayed on the television monitor 20 based on the pitching related command, the batter character 70 in the ready posture at the plate is displayed on the television monitor 20 based on the send-off command to the batter character 70.

Figure 6:
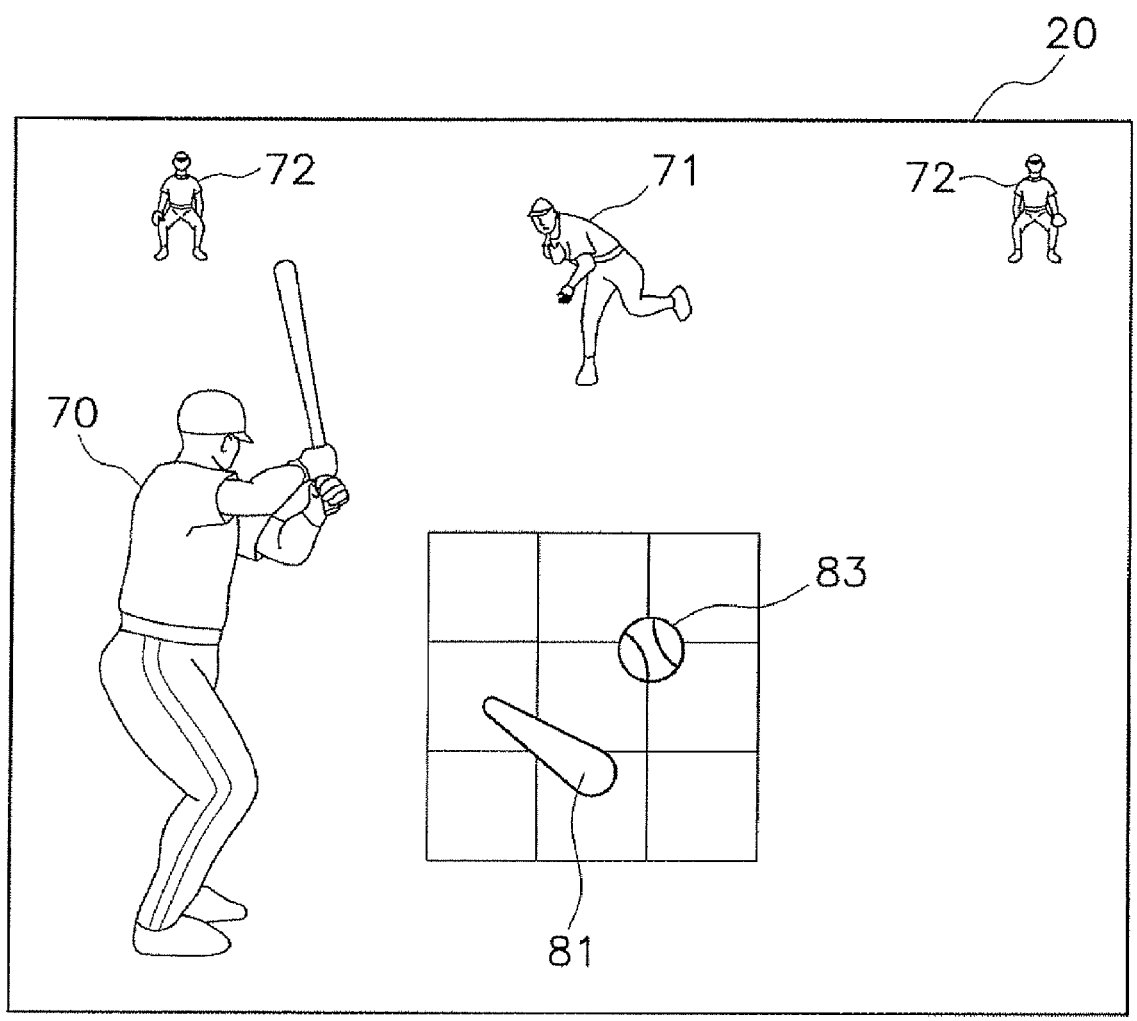
FIG. 6 is a diagram for describing a second annunciation image.

Next, if the ball is thrown from the pitcher character 71, the ball thrown from the pitcher character 71 is displayed on the television monitor 20 using the image data for the ball. Then, a second annunciation image 83 for informing the ability of the pitcher character 71, for example, a second annunciation image 83 for informing the strength of the ball thrown from the pitcher character 71, as shown in FIG. 6, is displayed on an anticipated position of the ball that will pass through the hitting plane (anticipated passing position of the ball) (S414). This second annunciation image 83 is displayed on the television monitor 20 using the image data for the second annunciation image, based on the ability data N2 corresponding to the strength of the ball that the pitcher character 71 throws.

In this configuration, the second annunciation image 83 changes according to the ability data N2 of the pitcher character 71. For example, if the strength of the ball that the pitcher character 71 throws is great, the image data, which the ball image on the anticipated passing position of the ball becomes small, is recognized by the CPU 7. Then, by using this image data, the second annunciation image (ball image) 83 for informing that the strength of the ball is great is displayed on the television monitor 20. On the other hand, if the strength of the ball that the pitcher character 71 throws is small, the image data, which the ball image on the anticipated passing position of the ball becomes big, is recognized by the CPU 7. And, by using this image data, the second annunciation image (ball image) 83 for informing that the strength of the ball is small is displayed on the television monitor 20.

More specifically, if the strength of the ball that the pitcher character 71 throws is "weakest strength", that is, if the value of the ability data N2 of the pitcher character 71 is "1", the strength of the ball being "weakest strength" is informed on the television monitor 20 by using the image data with the size of the ball image being "biggest". If the strength of the ball that the pitcher character 71 throws is "little strength", that is, if the value of the ability data N2 of the pitcher character 71 is "2", the strength of the ball being "little strength" is informed on the television monitor 20 by using the image data, which the size of the ball image is "big".

In the same way, if the strength of the ball that the pitcher character 71 throws is "great strength", that is, if the value of the ability data N2 of the pitcher character 71 is "4", the strength of the ball being "great strength" is informed on the television monitor 20 by using the image data, which the size of the ball image is "small". If the strength of the ball that the pitcher character 71 throws is "greatest strength", that is, if the value of the ability data N2 of the pitcher character 71 is "5", the strength of the ball being "greatest strength" is informed on the television monitor 20 by using the image data, which the size of the ball image is "smallest".

In addition, if the strength of the ball that the pitcher character 71 throws is "normal", that is, if the value of the ability data N2 of the pitcher character 71 is "3", the strength of the ball being "normal" is informed on the television monitor 20 using the image data, which the size of the ball image is "normal".

In addition, the size of the image showing the strength of the ball is specified in advance in the game program. In this configuration, different sizes of images are prepared according to the extent of the strength of the ball (weakest strength, little strength, normal, great strength, greatest strength). The image data corresponding to the images are included in the basic game data.

Next, when the batter character 70 in the send-off movement, based on the send-off command to the batter character 70, is displayed on the television monitor 20 using the image data, whether or not a movement command (batting related command) for making the batter character 70 perform a swing movement is recognized in the CPU 7 is judged by the CPU 7 (S415). For example, based on the send-off command to the batter character 70, when the batter character 70 in the ready posture at the plate is displayed on the television monitor 20, whether or not the batting related command is recognized in the CPU 7 is judged by the CPU 7.

In this configuration, the batting related command is composed of the meet zone moving command for moving the meet zone 81, the swing starting command for indicating the start of the swing, and the like. In this case, when the batter character 70 in the ready posture at the plate is displayed on the television monitor 20, whether or not the swing starting command is recognized by the CPU 7 is judged by the CPU 7. For example, if the meet zone moving command is instructed, after the meet zone 81 is moved based on the meet zone moving command, whether or not the swing starting command is recognized in the CPU 7 is judged by the CPU 7. In addition, if the meet zone moving command is not instructed, in the state that the meet zone 81 is stationary, whether or not the swing starting command is recognized in the CPU 7 is judged by the CPU 7.

If the swing starting command is recognized by the CPU 7 (Yes in S415), the process of changing the image data for the meet zone so that the meet zone 81 becomes smaller is executed by the CPU 7 (S416). For example, despite that the send-off command is instructed to the batter character 70, if the swing starting command that is contrary to the send-off command is instructed to the batter character 70, a process unfavorable to the A player that gives commands to the batter, in other words, a process for changing the image data for the meet zone so that the meet zone 81 becomes smaller will be executed by the CPU 7.

Since the meet zone 81 is a region in which the ball that passes through the hitting plane can be hit back, if the meet zone 81 becomes smaller, the ball that could have been hit back may not be hit back, and a ball that could have been a hit could become a mishit. In this way, in the player intention reflection system, if a command contrary to the send-off command is instructed to the batter character 70, the situation becomes unfavorable to the A player who gives commands to the batter.

Next, whether or not the receiving of commands related to movements for the batter character 70, the pitcher character 71, and the fielder character 72 has been ended is judged by the CPU 7 (S417). For example, whether or not the flag that shows whether or not one play (one event) has been ended is erected is judged by the CPU 7.

In this configuration, one play starts from when the play is started until the state of the ball in play is ended. That is, one play is from the start of the play until a ball is dead. More specifically, one play is from the time that a play starting command for starting a play is recognized by the CPU 7 until the time that a play terminating command showing the end of the play is recognized by the CPU 7. Thus, if the play terminating command is recognized by the CPU 7, the process of assigning "1" to the value of the flag that shows that one play has been ended is executed by the CPU 7.

More specifically, whether or not the value of the flag that shows whether or not one play has been ended is "1" is judged by the CPU 7. And, if the value of the flag showing whether or not one play has been ended is "1" is judged by the CPU 7 (Yes in S417), the receiving of commands related to movements for the batter character 70, pitcher character 71, and the fielder character 72 is ended by the CPU 7 (S418). Then, the process of making the value of the flag that shows whether or not there is the instruction of the send-off command into "0" is executed by the CPU 7 (S419).

In addition, when the receiving of commands related to movements for the batter character 70, pitcher character 71, and the fielder character 72 ends (S418), even if a command related to movements for the batter character 70 and the pitcher character 71 is instructed, this command is rejected by the CPU 7. Furthermore, when the receiving of commands related to movements for the batter character 70, pitcher character 71, and the fielder character 72 ends (S418), the instruction of the send-off command to the batter character 70 is cancelled.

In this configuration, if the value of the flag that shows whether or not one play has been ended is not "1" is judged by the CPU 7 (if the value of the flag is "0" is judged by the CPU 7, No in S417), the receiving of commands related to movements for the batter character 70, pitcher character 71, and the fielder character 72 is continued by the CPU 7. That is, if a command related to movements for the batter character 70, pitcher character 71, and fielder character 72 is instructed, this command is accepted and recognized by the CPU 7. More specifically, a base-running command to the batter character 70, a fielding command to the pitcher character 71 and the fielder character 72, and the like are accepted and recognized by the CPU 7. In addition, during the middle of one play, the value of the flag is "0".

On the other hand, if a swing starting command is not recognized by the CPU 7 (No in S415), whether or not the receiving of commands related to movements for the batter character 70, pitcher character 71, and the fielder character 72 is ended is judged by the CPU 7 (S420). More specifically, in the state that the swing starting command for the batter character 70 is not recognized by the CPU 7, whether or not the receiving of commands related to movements for the batter character 70, pitcher character 71, and the fielder character 72 has been ended is monitored by the CPU 7.

If the swing starting command for the batter character 70 is not recognized by the CPU 7 (No in S415), and the receiving of commands related to movements for the batter character 70, pitcher character 71, and fielder character 72 is ended by the CPU 7 (Yes in S420), the process of changing the ability data N1 (*n*) so that the corresponding ability of the batter character 70 for each course becomes higher is executed by the CPU 7 (S421). Then, the altered ability data N1 (*n*) of the batter character 70 is stored in the RAM 12 (S422).

For example, in the state that the batter character 70 in the send-off movement is displayed on the television monitor 20, if the flag that shows whether or not one play has been ended is erected is judged by the CPU 7, the process of changing the ability data N1 (*n*) so that the corresponding ability of the batter character 70 for each course becomes higher is executed by the CPU 7. Then, the altered ability data N1 (*n*) of the batter character 70 is stored in the RAM 12.

More specifically, in the state that the batter character 70 in the ready posture at the plate is displayed on the television monitor 20, if the value of the flag that shows whether or not one play has ended is judged to be "1" by the CPU 7, the process of adding "1" to the value of the ability data N1 (*n*) of the batter character 70 for each course is executed by the CPU 7. Then, the altered ability data N1 (*n*) of the batter character 70 is stored in the RAM 12. In this case, since the value of the ability data N1 (*n*) of the batter character 70 for each course becomes bigger, the corresponding ability of the batter character 70 for each course becomes higher.

In addition, in this configuration, since the maximum value of the ability data N1 (*n*) of the batter character 70 for each course is set to be "5", if the ability data N1 (*n*) of the batter character 70 is "5", the addition process will not be executed.

In addition, if the swing starting command to the batter character 70 is not recognized by the CPU 7 (No in S415), and the receiving of commands related to movements for the batter character 70, pitcher character 71, and fielder character 72 is ended by the CPU 7 (Yes in S420), the process of changing the ability data so that the strength of the ball that the pitcher character 71 throws becomes smaller is executed by the CPU 7 (S423). Then, the altered ability data N2 of the pitcher character 71 is stored in the RAM 12 (S424).

For example, in the state that the batter character 70 in the send-off movement is displayed on the television monitor 20, if the flag that shows whether or not one play has ended is judged by the CPU 7 to be erected, the process of changing the ability data so that the strength of the ball that the pitcher character 71 throws becomes smaller is executed by the CPU 7. Then, the altered ability data N2 of the pitcher character 71 is stored in the RAM 12.

More specifically, in the state that the batter character 70 in the ready posture at the plate is displayed on the television monitor 20, if the value of the flag that shows whether or not one play has ended is judged by the CPU 7 to be "1", the process of subtracting "1" from the value of the ability data N2 corresponding to the strength of the ball that the pitcher character 71 throws is executed by the CPU 7. Then, the altered ability data N2 of the pitcher character 71 is stored in the RAM 12. In this case, since the value of the ability data N2 of the pitcher character 71 becomes smaller, the strength of the ball that the pitcher character 71 throws next becomes smaller.

In addition, in this configuration, since the minimum value of the ability data N2 corresponding to the strength of the ball that the pitcher character 71 throws is set to be "1", if the ability data N2 of the pitcher character 71 is "1", the subtraction process will not be executed.

Furthermore, if the swing starting command to the batter character 70 is not recognized by the CPU 7 (No in S415), and the receiving of commands related to movements for the batter character 70, pitcher character 71, and fielder character 72 is ended by the CPU 7 (Yes in S420), the process of making the value of the flag that shows whether or not there is an instruction of the send-off command into "0" is executed by the CPU 7 (S425). By doing so, the instruction of the send-off command to the batter character 70 is cancelled.

Next, whether or not this competing event between the one batter character 70 and the pitcher character 71 has ended is judged by the CPU 7 (S426). For example, whether or not the flag that shows whether or not the competing event has ended is erected is judged by the CPU 7. More specifically, whether or not the value of the flag that shows whether or not the competing event has ended is "1" is judged by the CPU 7.

If the competing event between the batter character 70 and the pitcher character 71 has ended (Yes in S426), for example, if the value of the flag that shows whether or not the competing event is ended is judged by the CPU 7 to be "1", the process of resetting the changes of the ability data N1 (*n*) of the batter character 70 and the ability data N2 of the pitcher character 71 is executed by the CPU 7. In this case, the process of returning the ability data N1 (*n*) of the batter character 70 and ability data N2 of the pitcher character 71 to the ability data thereof when the competing event was started is executed by the CPU 7.

In addition, the ability data N1 (*n*) of the batter character 70 and the ability data N2 of the pitcher character 71 at the time when the competing event is started are stored in the RAM 12 when the competing event is started.

Next, whether or not the competing mode in which the teams compete against each other has ended is judged by the CPU 7 (S428). For example, whether or not the flag that shows whether or not the competing mode is ended is erected is judged by the CPU 7. More specifically, whether or not the value of the flag that shows whether or not the competing mode has ended is "1" is judged by the CPU 7.

If the competing mode between the batter character 70 and the pitcher character 71 has ended (Yes in S428), for example, if the value of the flag that shows whether or not the competing mode has ended is judged by the CPU 7 to be "1", the process of storing the data in the RAM 12 is executed by the CPU 7 (S429).

On the other hand, if the competing mode between the batter character 70 and the pitcher character 71 has not ended (No in S428), for example, if the value of the flag that shows whether or not the competing mode has ended is judged by the CPU 7 to be "0", the recognition of the next ability data of the batter character 70 and the ability data of the pitcher character 71 is executed by the CPU 7 (S402, S403).

In this configuration, if the competing event between the batter character 70 and the pitcher character 71 has not ended (No in S426), for example, if the value of the flag that shows whether or not the competing event has ended is judged by the CPU 7 to be not "1" (if the value of the flag that shows whether or not the competing event has ended is judged by the CPU 7 to be "0"), by using the altered ability data N1 (*n*) of the batter character 70 and the altered ability data N2 of the pitcher character 71 that are stored in the RAM 12, the process from Step 407 (S407) to Step 426 (S426) are executed by the CPU 7 again.

By doing so, if the ability data N1 (*n*) of the batter character 70 and the ability data N2 of the pitcher character 71 are altered, in Step 407 (S407), the first annunciation image 82 for informing the courses that the batter character 70 is good at and poor at is altered based on the altered ability data N1 (*n*) of the batter character 70 and the altered ability data N2 of the pitcher character 71, and displayed. On the other hand, if the ability data N1 (*n*) of the batter character 70 and the ability data N2 of the pitcher character 71 are not altered, in Step 407 (S407), the first annunciation image 82 for informing the courses that the batter character 70 is good at and poor at is displayed based on the unchanged ability data N1 (*n*) of the batter character 70 and the unchanged ability data N2 of the pitcher character 71.

In addition, if a swing regulation command, for example, a send-off command, for controlling the swing movement of the batter character 70 is not instructed to the batter character 70 (No in S408), that is, if a movement command for operating the pitcher character 71 is instructed to the pitcher character 71, the processes from Step 411 (S411) to Step 425 (S425), except Step 416 (S416), Step 419 (S419), and Steps 421 (S421) to 425 (S425), are executed by the CPU 7 (S430 to S437).

In this manner, in this embodiment, the send-off command is instructed to the batter character 70 to have the mental attitude of a batter of observing the ball carefully. In addition, when the receiving of commands related to movements for the batter character 70 and the pitcher character 71 is ended, the ability data of the batter character 70 is altered. In this way, by incorporating the effect of the mental attitude of the batter in a play in an actual baseball game into the baseball game, the player is able to experience the effect of the mental attitude of the batter in a play in the baseball game.

For example, in this embodiment, after the send-off command is instructed to the batter character 70 to have the mental attitude of a batter of observing the ball carefully, if one play ended during the send-off movement, the player is able to experience the effect in a play of the mental attitude of the batter of observing the ball carefully, by changing the ability of the batter character 70. In addition, the player can confirm the effect of the mental attitude of the batter of observing the ball carefully in a play through the first annunciation image 82 corresponding to the ability data that shows the corresponding ability of the batter character 70 for each course.

For example, in this embodiment, after the send-off command is instructed to the batter character 70 to have the mental attitude of a batter of observing the ball carefully, if the movement opposite to the send-off movement, that is, the swing movement, is executed by the batter character 70, the effect of the movement opposite to the send-off movement on a play can be experienced by the player by the changing of the size of the meet zone 81.

For example, in this embodiment, the player is able to experience the superiority, of the eyes being used to the ball by observing the ball carefully, over the pitcher, by changing the ability of the pitcher character 71. In addition, the player can confirm the effect to a play of the mental attitude of the batter of observing the ball carefully through the second annunciation image 83 corresponding to the ability data that shows the strength of the ball.

Other Embodiments (a) In the above embodiment, an example was shown for the case in which a home video game apparatus is used as an example of a computer in which the game program can be applied. However, the game apparatus is not limited to the embodiment described above, and application can also be made in the same manner to a game apparatus in which a monitor is separately configured, a game apparatus in which a monitor is integrally configured, or a personal computer, workstation, or other device that functions as a game apparatus by executing the game program. In addition, the game apparatus is not limited to the embodiment described above, and application can also be made in the same manner to a portable computer, a portable game apparatus, or the like.

(b) Also included in the present invention is a program that executes the game as described above, and a computer-readable recording medium on which this program is recorded. In addition to a cartridge, other examples of the recording medium include a computer-readable flexible disk, semiconductor memory, CD-ROM, DVD, MO, and ROM cassette.

The terms of degree such as "substantially", "about" and "approximately" as used herein mean a reasonable amount of deviation of the modified term such that the end result is not significantly changed. These terms should be construed as including a deviation of at least ± 5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A non-transitory computer readable medium storing a computer program for a baseball video game in which a first character and a second character are displayed on an image displaying unit, the computer program comprising:
    code for recognizing first ability of the first character being a batter, the first ability being related to hitting a ball dispatched from the second character being a pitcher;
    code for recognizing a regulation command to make the first character take no action against the ball from the pitcher in order to get the ball passed;
    code for recognizing a movement command to operate the second character to dispatch the ball;
    code for displaying the second character on the image displaying unit, based on the movement command;
    code for displaying the first character on the image displaying unit, based on the regulation command;
    code for stopping receiving commands to operate the first and second characters, after receiving the movement command and the regulation command to make the first character take no action against the ball from the pitcher in order to get the ball passed; and
    code for changing the first ability in response to the first character taking no action against the ball, after receiving the commands is stopped.

2. The non-transitory computer readable medium according to claim 1, the game program further comprising
    code for displaying a target which the first character moves and in which the first character hits the ball, on the image displaying unit.

3. The non-transitory computer readable medium according to claim 2, the game program further comprising
    code for recognizing a movement command to operate the first character, and
    code for making the target smaller, if the movement command is recognized after the regulation command is recognized.

4. The non-transitory computer readable medium according to claim 2, wherein
    if the movement command is not recognized after the regulation command is recognized and receiving of the commands is stopped, the first ability of the first character is enhanced.

5. The non-transitory computer readable medium according to claim 1, the game program further comprising
    code for displaying a first annunciation image on the image displaying unit in order to inform the first ability.

6. The non-transitory computer readable medium according to claim 1, the game program further comprising
   code for recognizing second ability of the second character, and
   code for changing the second ability, after receiving the commands is stopped.

7. The non-transitory computer readable medium according to claim 6, the game program further comprising
   code for recognizing a movement command to operate the first character, wherein
   if the movement command is not recognized after the regulation command is recognized and receiving of the commands is stopped, the second ability of the second character is deteriorated.

8. The non-transitory computer readable medium according to claim 6, the game program further comprising
   code for displaying a second annunciation image on the image displaying unit in order to inform the second ability of the second character.

9. A game apparatus for a baseball video game in which a first character and a second character are displayed on an image displaying unit, the game apparatus comprising:
   a first ability data recognition unit configured to recognize first ability of the first character being a pitcher, the first ability being related to hitting a ball dispatched from the second character being a pitcher;
   a regulation command recognition unit configured to recognize a regulation command to make the first character take no action against the ball from the pitcher in order to get the ball passed;
   a movement command recognition unit configured to recognize a movement command to operate the second character to dispatch the ball;
   a movement display unit configured to display the second character on the image displaying unit, based on the movement command;
   a controlled movement display unit configured to display the first character on the image displaying unit, based on the regulation command;
   a command receipt termination unit configured to stop receiving commands to operate the first and second characters, after receiving the movement command and the regulation command to make the first character take no action against the ball from the pitcher in order to get the ball passed; and
   a first ability alteration unit configured to change the first ability after receiving the commands is stopped, if the regulation command is inputted.

* * * * *